(12) United States Patent
Fukui

(10) Patent No.: US 11,021,978 B2
(45) Date of Patent: Jun. 1, 2021

(54) GAS TURBINE STATOR VANE AND GAS TURBINE PROVIDED WITH SAME

(71) Applicant: Mitsubishi Hitachi Power Systems, Ltd., Kanagawa (JP)

(72) Inventor: Yoshio Fukui, Yokohama (JP)

(73) Assignee: MITSUBISHI POWER, LTD., Kanagawa (JP)

(*) Notice: Subject to any disclaimer, the term of this patent is extended or adjusted under 35 U.S.C. 154(b) by 0 days.

(21) Appl. No.: 16/651,006

(22) PCT Filed: Oct. 22, 2018

(86) PCT No.: PCT/JP2018/039166
§ 371 (c)(1),
(2) Date: Mar. 26, 2020

(87) PCT Pub. No.: WO2019/082838
PCT Pub. Date: May 2, 2019

(65) Prior Publication Data
US 2020/0300104 A1  Sep. 24, 2020

(30) Foreign Application Priority Data

Oct. 23, 2017 (JP) .............................. JP2017-204676

(51) Int. Cl.
*F01D 9/02* (2006.01)
*F01D 5/18* (2006.01)
(Continued)

(52) U.S. Cl.
CPC .............. *F01D 9/023* (2013.01); *F01D 5/187* (2013.01); *F01D 25/12* (2013.01); *F02C 7/18* (2013.01)

(58) Field of Classification Search
CPC . F01D 9/023; F01D 25/12; F01D 5/18; F01D 5/187; F01D 5/081; F02C 7/18
See application file for complete search history.

(56) References Cited

U.S. PATENT DOCUMENTS

| 4,017,213 A | 4/1977 | Przirembel |
| 5,609,466 A | 3/1997 | North et al. |

(Continued)

FOREIGN PATENT DOCUMENTS

| EP | 2 562 358 | 2/2013 |
| JP | 2001-254605 | 9/2001 |

(Continued)

OTHER PUBLICATIONS

International Search Report dated Dec. 25, 2018 in International (PCT) Application No. PCT/JP2018/039166, with English Translation.

(Continued)

*Primary Examiner* — Jacob M Amick
(74) *Attorney, Agent, or Firm* — Wenderoth, Lind & Ponack, L.L.P.

(57) ABSTRACT

A shroud of a stator vane includes a suction-side passage, a pressure-side passage, and a plurality of rear-end passages. The plurality of rear-end passages are disposed to be aligned in a lateral direction between the suction-side passage extending along a suction-side end surface and the pressure-side passage extending along a pressure-side end surface, and open at a rear end surface. A suction-side first rear-end passage closest to the suction-side passage among the plurality of rear-end passages gradually extends closer to the suction-side passage toward a downstream side. A pressure-side first rear-end passage closest to the pressure-side passage among the plurality of rear-end passages gradually extends closer to the pressure-side passage toward the downstream side.

17 Claims, 11 Drawing Sheets

(51) Int. Cl.
*F01D 25/12* (2006.01)
*F02C 7/18* (2006.01)

(56) References Cited

U.S. PATENT DOCUMENTS

| 8,632,298 | B1* | 1/2014 | Liang |
| 2001/0021343 | A1* | 9/2001 | Kuwabara ............... F01D 9/041 |
| | | | 415/115 |
| 2004/0018082 | A1 | 1/2004 | Soechting |
| 2004/0151586 | A1 | 8/2004 | Chlus et al. |
| 2010/0047056 | A1 | 2/2010 | Lee et al. |
| 2018/0045060 | A1 | 2/2018 | Matsuo et al. |
| 2019/0032499 | A1 | 1/2019 | Matsuo et al. |

FOREIGN PATENT DOCUMENTS

| JP | 2004-60638 | 2/2004 |
| JP | 2004-232634 | 8/2004 |
| JP | 2009-162228 | 7/2009 |
| JP | 2017-160892 | 9/2017 |
| WO | 2011/132217 | 10/2011 |
| WO | 2016/039714 | 3/2016 |
| WO | 2016/152573 | 9/2016 |

OTHER PUBLICATIONS

Written Opinion dated Dec. 25, 2018 in International (PCT) Application No. PCT/JP2018/039166, with English Translation.

\* cited by examiner

GAS TURBINE STATOR VANE AND GAS TURBINE PROVIDED WITH SAME

TECHNICAL FIELD

The present invention relates to a gas turbine stator vane and a gas turbine provided with the same.

The present application claims priority based on JP 2017-204676 filed in Japan on Oct. 23, 2017, the contents of which are incorporated herein by reference.

BACKGROUND ART

A gas turbine includes a rotor that rotates around an axis, and a casing that covers this rotor. The rotor includes a rotor shaft and a plurality of rotor vanes attached to this rotor shaft. In addition, a plurality of stator vanes are provided inside the casing.

The stator vane includes a vane body having a blade shape and extending in the radial direction with respect to the axis, an inner shroud provided on the radial inner side of the vane body, and an outer shroud provided on the radial outer side of the vane body. The vane body of the stator vane is disposed in a combustion gas flow path through which combustion gas passes. The inner shroud defines a position on the radial inner side of the combustion gas flow path. The outer shroud defines a position on the radial outer side of the combustion gas flow path.

The stator vane of the gas turbine is exposed to high-temperature combustion gas. Therefore, the stator vane is generally cooled with air or the like.

For example, various passages through which cooling air passes are formed in a stator vane described in Patent Document 1 described below. Specifically, a vane passage radially extending and receiving cooling air is formed in the vane body of the stator vane. In addition, a cavity for supplying cooling air to the vane passage of the vane body is formed in each of an inner shroud and an outer shroud. Further, a suction-side passage, a pressure-side passage, and a plurality of rear-end passages are formed in each of the inner shroud and the outer shroud. The suction-side passage communicates with the cavity, extends along a suction-side end surface of the shroud, and opens at a rear end surface of the shroud. The pressure-side passage communicates with the cavity, extends along a pressure-side end surface of the shroud, and opens at the rear end surface of the shroud. The plurality of rear-end passages are disposed to be aligned between the suction-side passage and the pressure-side passage on the rear end surface side with respect to the cavity, communicate with the cavity, and open at the rear end surface.

CITATION LIST

Patent Document

Patent Document 1: JP 2004-060638 A

SUMMARY OF INVENTION

Technical Problem

Concerning a stator vane of a gas turbine, it is desirable to effectively cool this stator vane to improve the durability of the stator vane, and to reduce an amount of air used to cool this stator vane as much as possible.

Then, an object of the present invention is to provide a gas turbine stator vane that can be cooled efficiently, and a gas turbine provided with this gas turbine stator vane.

Solution to Problem

According to an aspect of the present invention for achieving the above-described object, a gas turbine stator vane includes a vane body having a blade shape and disposed in a combustion gas flow path, and a shroud provided at an end in a vane height direction of the vane body. The shroud includes: a gas path surface being in contact with combustion gas flowing through the combustion gas flow path; a front end surface being an end surface on a front edge side with respect to a rear edge of the vane body, the front end surface facing an upstream side from which the combustion gas flows in the combustion gas flow path; a rear end surface located back-to-back with the front end surface, the rear end surface facing a downstream side to which the combustion gas flows in the combustion gas flow path; a suction-side end surface connecting the front end surface to the rear end surface, the suction-side end surface being an end surface on a suction-side surface side with respect to a pressure-side surface of the vane body; a pressure-side end surface located back-to-back with the suction-side end surface, the pressure-side end surface connecting the front end surface to the rear end surface, and being an end surface on a pressure-side surface side with respect to the suction-side surface of the vane body; a cavity formed in a region surrounded by the front end surface, the rear end surface, the suction-side end surface, and the pressure-side end surface, the cavity receiving cooling air; a suction-side passage disposed on the suction-side end surface side with respect to the cavity in a lateral direction in which the suction-side end surface and the pressure-side end surface are aligned, the suction-side passage communicating with the cavity, extending along the suction-side end surface toward the downstream side, and opening at the rear end surface; a pressure-side passage disposed on the pressure-side end surface side with respect to the cavity in the lateral direction, the pressure-side passage communicating with the cavity, extending along the pressure-side end surface toward the downstream side, and opening at the rear end surface; and a plurality of rear-end passages disposed to be aligned in the lateral direction between the suction-side passage and the pressure-side passage on the rear end surface side with respect to the cavity, the plurality of rear-end passages communicating with the cavity, and opening at the rear end surface. A suction-side first rear-end passage closest to the suction-side passage in the lateral direction among the plurality of rear-end passages gradually extends closer to the suction-side passage toward the downstream side. A pressure-side first rear-end passage closest to the pressure-side passage in the lateral direction among the plurality of rear-end passages gradually extends closer to the pressure-side passage toward the downstream side.

A wake of the combustion gas is formed in a region located on a downstream side of a rear edge of the vane body along a camber line. This wake increases a heat transfer coefficient between the combustion gas and an outer shroud. Therefore, the region located on the downstream side of the rear edge of the vane body along the camber line in the gas path surface is easily heated with the combustion gas. In other words, a region located along the rear end surface on a circumferential pressure side (one side in the lateral direction) in the gas path surface is easily heated with the combustion gas. A wake region formed due to the vane body of a first stator vane extends into a region located along the rear end surface on a circumferential suction side (the other side in the circumferential direction) in the gas path surface of a second stator vane adjacent to the circumferential pressure side of the first stator vane. Thus, the region located along the rear end surface on the circumferential suction side in the gas path surface is also easily heated with the combustion gas.

The suction-side first rear-end passage in the present aspect gradually extends closer to the suction-side passage toward the downstream side. Therefore, in the present aspect, in the rear end surface, a distance between a position where the suction-side passage opens and a position where the suction-side first rear-end passage opens is shorter than the distance in the case where the suction-side first rear-end passage is parallel to the suction-side passage. Therefore, in the present aspect, the cooling capacity in the region located along the rear end surface on the circumferential pressure side in the gas path surface is enhanced.

The pressure-side first rear-end passage in the present aspect gradually extends closer to the pressure-side passage toward the downstream side. Therefore, in the present aspect, in the rear end surface, a distance between a position where the pressure-side passage opens and a position where the pressure-side first rear-end passage opens is shorter than the distance in the case where the pressure-side first rear-end passage is parallel to the pressure-side passage. Therefore, in the present aspect, the cooling capacity in the region located along the rear end surface on the circumferential suction side in the gas path surface is enhanced.

In the present aspect, the suction-side first rear-end passage gradually extends closer to the suction-side passage toward the downstream side, and the pressure-side first rear-end passage gradually extends closer to the pressure-side passage toward the downstream side. Therefore, a distance between positions where any two rear-end passages adjacent to each other in the lateral direction open among the plurality of rear-end passages between the suction-side first rear-end passage and the pressure-side first rear-end passage is longer than the distance in the case where all of the rear-end passages are parallel to each other. Therefore, in the present aspect, the cooling capacity in a portion of a region between the suction-side first rear-end passage and the pressure-side first rear-end passage in the lateral direction lowers. However, a portion of a region located along the rear end surface between the suction-side first rear-end passage and the pressure-side first rear-end passage in the lateral direction in the gas path surface is less likely to be heated than the region located along the rear end surface on the circumferential suction side and the region located along the rear end surface on the circumferential pressure-side in the gas path surface. Thus, in the present aspect, in the gas path surface, even when the cooling capacity in a portion of the region located along the rear end surface between the suction-side first rear-end passage and the pressure-side first rear-end passage in the lateral direction lowers, the durability in this region does not lower much.

As described above, in the present aspect, since the cooling capacity in a region that is easily heated is enhanced and the cooling capacity in a region that is relatively less likely to be heated is lowered, the stator vane can be cooled effectively. Thus, according to the present aspect, it is possible to suppress an increase in an amount of air used for cooling the stator vane while improving the durability of this stator vane.

Here, in the gas turbine stator vane in the above-described aspect, among the plurality of rear-end passages, some of the plurality of rear-end passages except the suction-side first rear-end passage and the pressure-side first rear-end passage may be parallel to the suction-side end surface.

In addition, in the gas turbine stator vane in any of the above-described aspects, a suction-side second rear-end passage closest to the suction-side first rear-end passage in the lateral direction among the plurality of rear-end passages may gradually extend closer to the suction-side passage toward the downstream side, and an amount of displacement of the suction-side second rear-end passage toward the suction-side passage with respect to a unit displacement amount toward the downstream side may be smaller than the amount of displacement of the suction-side first rear-end passage. A pressure-side second rear-end passage closest to the pressure-side first rear-end passage in the lateral direction among the plurality of rear-end passages may gradually extends closer to the pressure-side passage toward the downstream side, and an amount of displacement of the pressure-side second rear-end passage toward the pressure-side passage with respect to the unit displacement amount toward the downstream side may be smaller than the amount of displacement of the pressure-side first rear-end passage.

In addition, in the gas turbine stator vane in any of the above-described aspects, a plurality of the rear-end passages including the suction-side first rear-end passage and being aligned from the suction-side first rear-end passage in the lateral direction may constitute a suction-side rear-end passage group, a plurality of the rear-end passages including the pressure-side first rear-end passage and being aligned from the pressure-side first rear-end passage in the lateral direction may constitute a pressure-side rear-end passage group, the plurality of the rear-end passages constituting the suction-side rear-end passage group may be parallel to each other, and the plurality of rear-end passages constituting the pressure-side rear-end passage group may be parallel to each other.

According to another aspect of the present invention for achieving the above-described object, a gas turbine stator vane includes a vane body having a blade shape and disposed in a combustion gas flow path, and a shroud provided at an end in a vane height direction of the vane body. The shroud includes: a gas path surface being in contact with combustion gas flowing through the combustion gas flow path; a front end surface being an end surface on a front edge side with respect to a rear edge of the vane body, the front end surface facing an upstream side from which the combustion gas flows in the combustion gas flow path; a rear end surface located back-to-back with the front end surface, the rear end surface facing a downstream side to which the combustion gas flows in the combustion gas flow path; a suction-side end surface connecting the front end surface to the rear end surface, the suction-side end surface being an end surface on a suction-side surface side with respect to a pressure-side surface of the vane body; a pressure-side end surface located back-to-back with the suction-side end surface, the pressure-side end surface connecting the front end surface to the rear end surface, and being an end surface on a pressure-side surface side with respect to the suction-side surface of the vane body; a cavity formed in a region surrounded by the front end surface, the rear end surface, the suction-side end surface, and the pressure-side end surface, the cavity receiving cooling air; and a plurality of rear-end passage groups each including a plurality of rear-end passages disposed to be aligned in a lateral direction in which the suction-side end surface and the pressure-side end surface are aligned on the rear end surface side with respect to the cavity, the plurality of rear-end passages communicating with the cavity, and opening at the rear end surface. The plurality of rear-end passages constituting each of the plurality of rear-end passage groups are parallel to each other. A plurality of the rear-end passages constituting a suction-side rear-end passage group closest to the suction-side end surface in the lateral direction among the plurality of rear-end passage groups gradually extend closer to the suction-side end surface toward the downstream side. A plurality of the rear-end passages constituting a pressure-side rear-end passage group closest to the pressure-side end surface in the lateral direction among the plurality of rear-end passage groups gradually extend closer to the pressure-side end surface toward the downstream side.

Similarly, in the present aspect, since the cooling capacity in a region that is easily heated is enhanced and the cooling capacity in a region that is relatively less likely to be heated is lowered, the stator vane can be cooled effectively. Thus, according to the present aspect, it is possible to suppress an increase in an amount of air used for cooling the stator vane while improving the durability of this stator vane.

Further, the plurality of rear-end passages constituting each of the plurality of rear-end passage groups in the present aspect are parallel to each other. Therefore, in the present aspect, it is possible to suppress time and effort to machine the plurality of rear-end passages as compared to the case where the plurality of rear-end passages extend in different directions.

The gas turbine stator vane in any of the above-described aspects including the suction-side rear-end passage group and the pressure-side rear-end passage group may include a central rear-end passage group including some of the plurality of rear-end passages and being located between the suction-side rear-end passage group and the pressure-side rear-end passage group in the lateral direction.

In this case, any of the plurality of rear-end passages constituting the central rear-end passage group may be parallel to the suction-side end surface.

In addition, the gas turbine stator vane in any of the above-described aspects may include a plurality of the vane bodies, and the plurality of vane bodies may be provided in the one shroud.

A gas turbine in an aspect of the present invention for achieving the above-described object includes: the gas turbine stator vane according to any of the above-described aspects; a rotor configured to rotate around an axis, a casing covering an outer circumferential side of the rotor, and a combustor configured to generate the combustion gas by combustion of fuel and send the combustion gas into the casing. The gas turbine stator vane is affixed to an inner circumferential side of the casing.

Advantageous Effect of Invention

According to an aspect of the present invention, it is possible to effectively cool a gas turbine stator vane and suppress an amount of air used for cooling while improving durability.

DESCRIPTION OF EMBODIMENTS

Various embodiments of the present invention and modifications of the embodiments will be described in detail with reference to the drawings.

Embodiment of Gas Turbine

An embodiment of a gas turbine will be described with reference to FIGS. 1 and 2.

Figure 1:
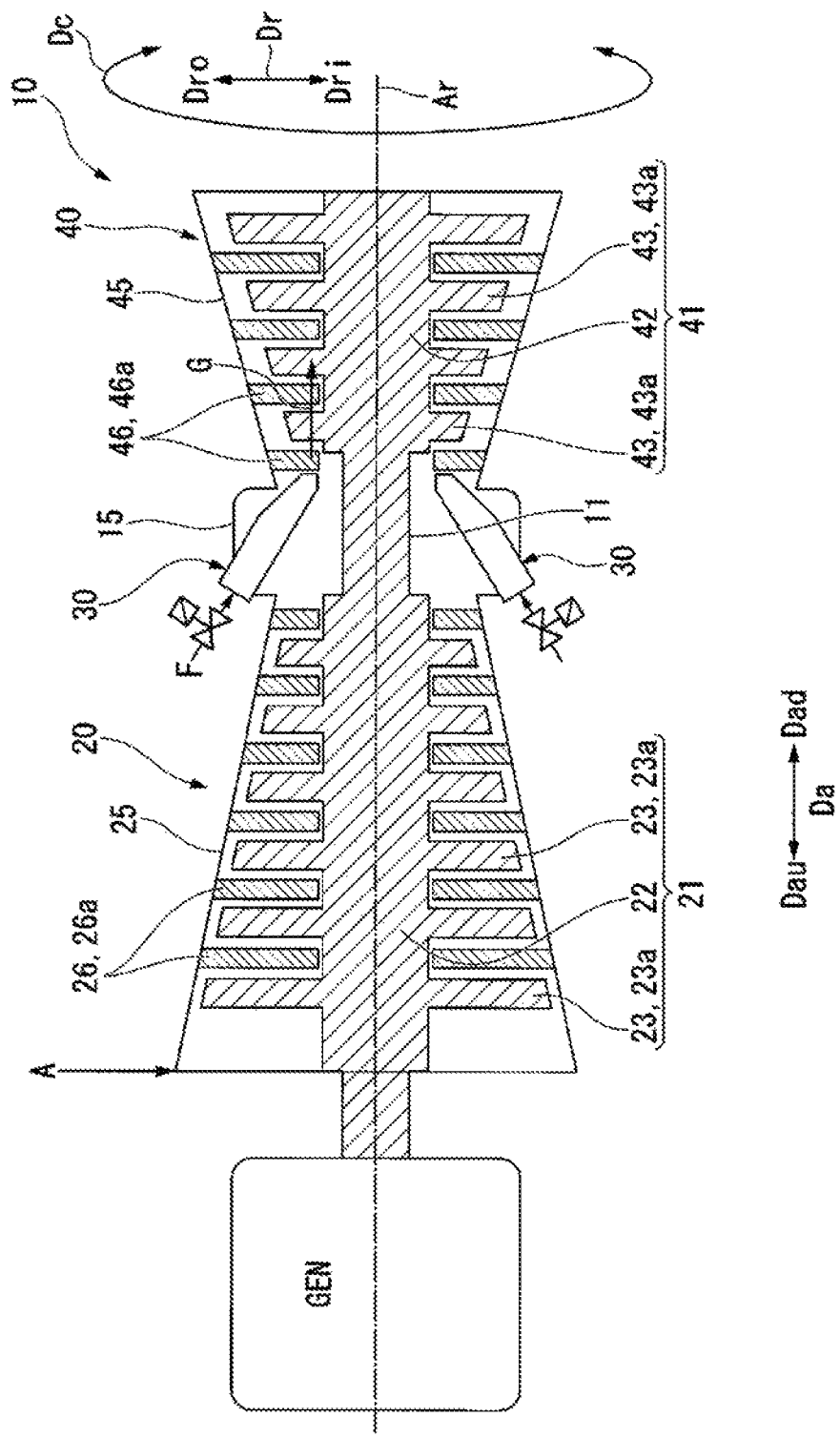
FIG. 1 is a schematic cross-sectional view of a gas turbine according to an embodiment of the present invention.

As illustrated in FIG. 1, a gas turbine 10 in the present embodiment includes a compressor 20 that compresses air A, a combustor 30 that generates combustion gas G by combustion of fuel F in the air A compressed by the compressor 20, and a turbine 40 driven by the combustion gas G.

The compressor 20 includes a compressor rotor 21 that rotates around an axis Ar, a compressor casing 25 that covers the compressor rotor 21, and a plurality of stator vane rows 26. The turbine 40 includes a turbine rotor 41 that rotates around the axis Ar, a turbine casing 45 that covers the turbine rotor 41, and a plurality of stator vane rows 46.

The compressor rotor 21 and the turbine rotor 41 are located on the same axis Ar, and connected to each other to form a gas turbine rotor 11. For example, a rotor of a generator GEN is connected to this gas turbine rotor 11. In addition, the compressor casing 25 and the turbine casing 45 are connected to each other to form a gas turbine casing 15. Note that in the following, it is assumed that a direction in which the axis Ar extends is an axial direction Da, a circumferential direction around this axis Ar is a circumferential direction Dc, and a direction orthogonal to the axis Ar is a radial direction Dr. In addition, it is assumed that, with respect to the turbine 40 in the axial direction Da, the compressor 20 side is an axial upstream side Dau, and a side opposite to the compressor 20 side is an axial downstream side Dad. In addition, it is assumed that, in the radial direction Dr, a side near the axis Ar is a radial inner side Dri, and a side opposite to the side near the axis Ar is a radial outer side Dro.

The compressor rotor 21 includes a rotor shaft 22 extending in the axial direction Da around the axis Ar, and a plurality of rotor vane rows 23 attached to this rotor shaft 22. The plurality of rotor vane rows 23 are aligned in the axial direction Da. Each of the rotor vane rows 23 includes a plurality of rotor vanes 23a aligned in the circumferential direction Dc. Each of the stator vane rows 26 is disposed on the axial downstream side Dad of each of the plurality of rotor vane rows 23. Each of the stator vane rows 26 is provided on an inner side of the compressor casing 25. Each of the stator vane rows 26 includes a plurality of stator vanes 26a aligned in the circumferential direction Dc.

Figure 2:
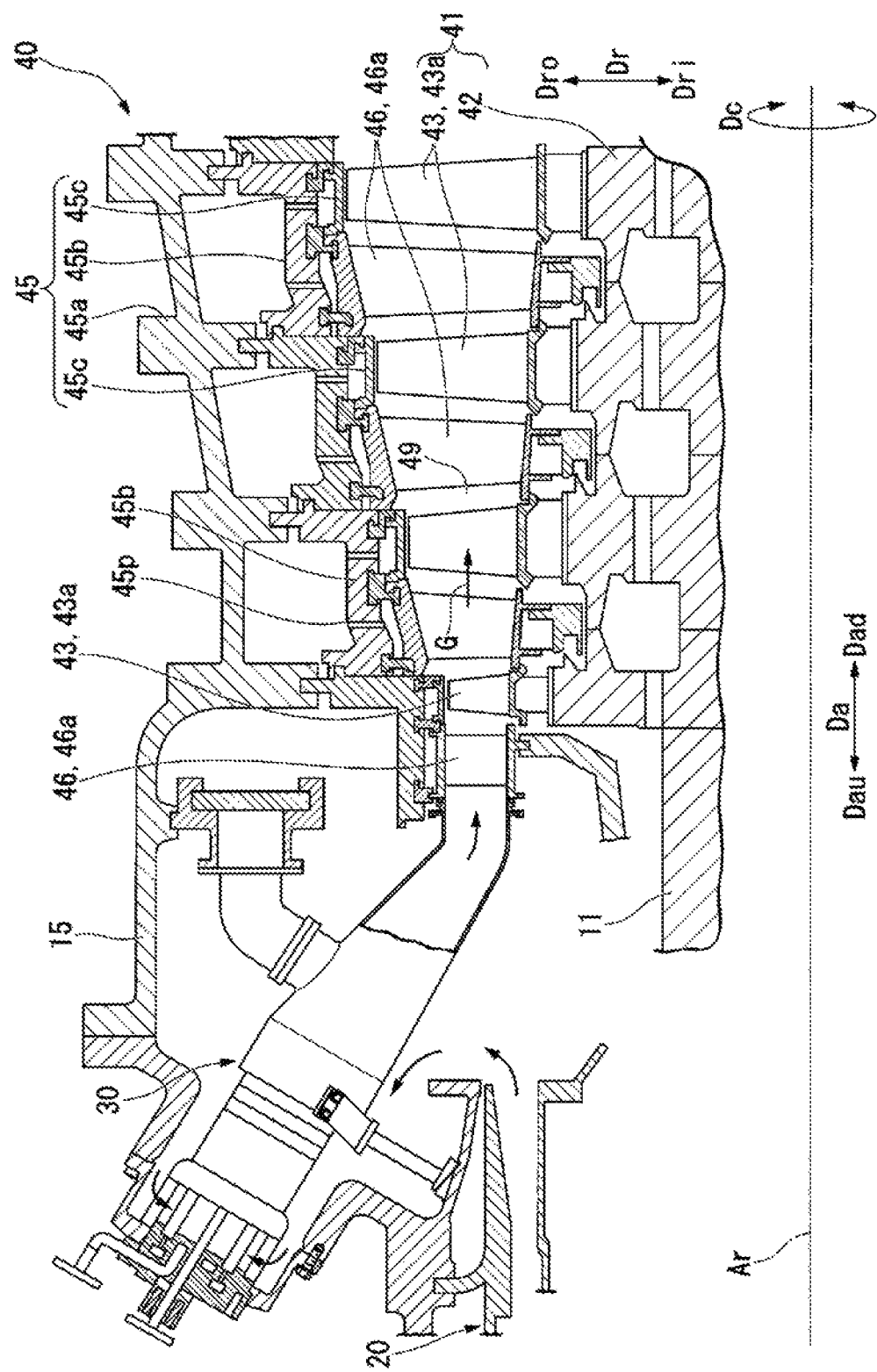
FIG. 2 is a cross-sectional view of a main portion of the gas turbine according to the embodiment of the present invention.

As illustrated in FIG. 2, the turbine rotor 41 includes a rotor shaft 42 extending in the axial direction Da around the axis Ar, and a plurality of rotor vane rows 43 attached to this rotor shaft 42. The plurality of rotor vane rows 43 are aligned in the axial direction Da. Each of the rotor vane rows 43 includes a plurality of rotor vanes 43a aligned in the circumferential direction Dc. Each of the stator vane rows 46 is disposed on the axial upstream side Dau of each of the plurality of rotor vane rows 43. Each of the stator vane rows 46 is provided on an inner side of the turbine casing 45. Each of the stator vane rows 46 includes a plurality of gas turbine stator vanes 46a aligned in the circumferential direction Dc. Note that, in the following, the gas turbine stator vane is simply referred to as a stator vane. The turbine casing 45 includes an outer casing 45a that has a tubular shape and that constitutes an outer shell of the turbine casing 45, an inner casing 45b affixed to an inner side of the outer casing 45a, and a plurality of ring segments 45c affixed to an inner side of the inner casing 45b. The plurality of ring segments 45c each are provided at a position between the plurality of stator vane rows 46 adjacent to each other. Accordingly, the rotor vane rows 43 are disposed on the radial inner side Dri of the respective ring segments 45c.

A ring-shaped space which is located between an outer circumferential side of the rotor shaft 42 and an inner circumferential side of the turbine casing 45, and in which the stator vanes 46a and the rotor vanes 43a are disposed in the axial direction Da forms a combustion gas flow path 49 through which the combustion gas G from the combustor 30 flows. This combustion gas flow path 49 forms a ring shape around the axis Ar, and is long in the axial direction Da. A cooling air passage 45p extending from the radial outer side Dro into the radial inner side Dri is formed in the inner casing 45b of the turbine casing 45. Cooling air passing through this cooling air passage 45p is introduced into the stator vanes 46a and the ring segments 45c to be used for cooling the stator vanes 46a and the ring segments 45c. Note that, depending on the stator vane rows 46, air in the gas turbine casing 15 may be supplied as cooling air to the stator vanes 46a constituting these stator vane rows 46 without passing through the cooling air passage 45p of the turbine casing 45.

As illustrated in FIG. 1, the compressor 20 compresses the air A to generate compressed air. The combustor 30 receives this compressed air. The fuel F is supplied to the combustor 30. Inside the combustor 30, the fuel F is combusted in the compressed air to generate the combustion gas G having high temperature and high pressure. This combustion gas G is sent from the combustor 30 to the combustion gas flow path 49 in the turbine 40. The turbine rotor 41 rotates by the combustion gas G while the combustion gas G flows through the combustion gas flow path 49 toward the axial downstream side Dad. The rotor of the generator GEN connected to the gas turbine rotor 11 rotates by the rotation of this turbine rotor 41. As a result, the generator GEN generates power.

Various embodiments of the stator vanes 46a of the above-described gas turbine 10 described above will be described below.

First Embodiment of Stator Vane

A stator vane according to a first embodiment of the present invention will be described below with reference to FIGS. 3 and 4.

Figure 3:
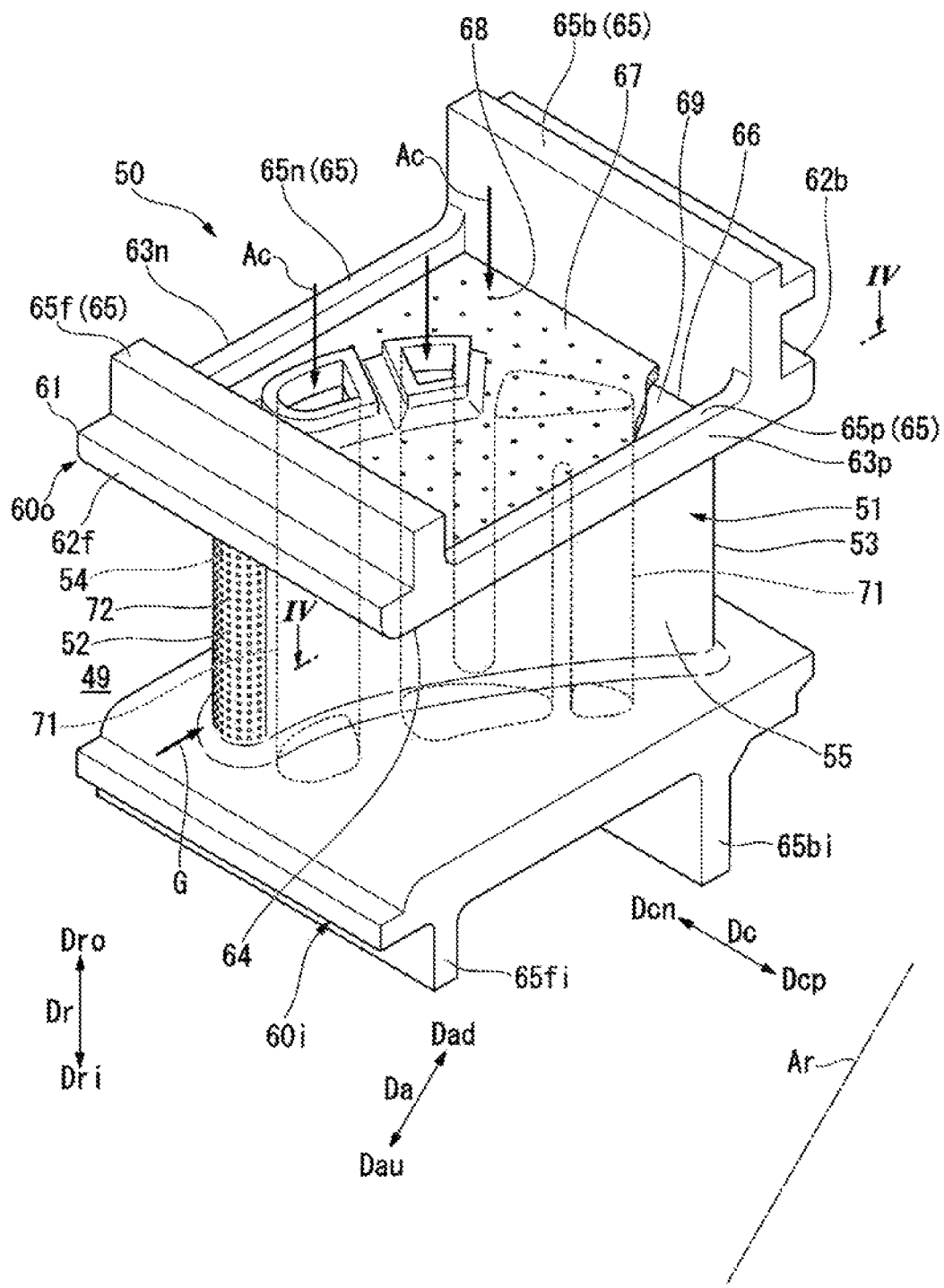
FIG. 3 is a perspective view of a stator vane according to a first embodiment of the present invention.

As illustrated in FIG. 3, a stator vane (gas turbine) 50 in the present embodiment includes a vane body 51 having a blade shape and extending in the radial direction Dr, an inner shroud 60i formed at an end on the radial inner side Dri of the vane body 51, and an outer shroud 60o formed at an end on the radial outer side Dro of the vane body 51. The vane body 51 is disposed in the combustion gas flow path 49 (see FIG. 2) through which the combustion gas G passes. The inner shroud 60i defines a position on the radial inner side Dri of the combustion gas flow path 49 having a ring shape. In addition, the outer shroud 60o defines a position on the radial outer side Dro of the combustion gas flow path 49 having a ring shape.

Figure 4:
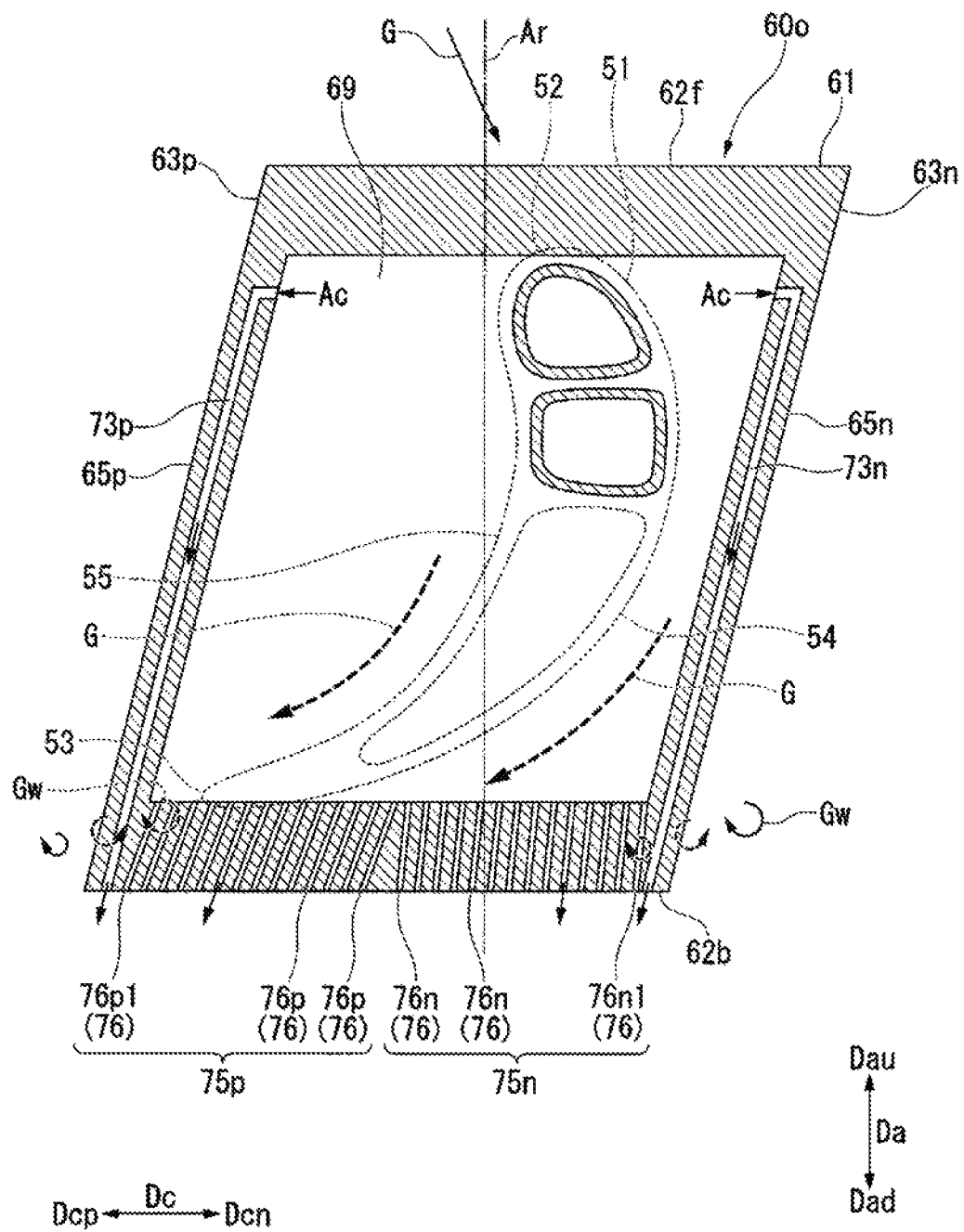
FIG. 4 is a cross-sectional view taken along line IV-IV in FIG. 3.

As illustrated in FIG. 4, an end portion on the axial upstream side Dau of the vane body 51 forms a front edge 52, and an end portion on the axial downstream side Dad of the vane body 51 forms a rear edge 53. Among surfaces of this vane body 51 facing in the circumferential direction Dc, a convex surface forms a suction-side surface 54 (being a negative pressure surface), and a concave surface forms a pressure-side surface 55 (being a positive pressure surface). Note that, for convenience of the description below, the circumferential direction Dc may be referred to as a lateral direction Dc. In addition, it is assumed that a side on which the pressure-side surface 55 is present with respect to the suction-side surface 54 in the circumferential direction Dc is a circumferential pressure-side Dcp, and a side on which the suction-side surface 54 is present with respect to the pressure-side surface 55 in the circumferential direction Dc is a circumferential suction-side Dcn. In addition, the axial upstream side Dau in the axial direction Da may be referred to as a front side, and the axial downstream side Dad in the axial direction Da may be referred to as a rear side. In addition, the radial direction Dr may be referred to as a vane height direction Dr.

The inner shroud 60i and the outer shroud 60o include essentially the same structure. Then, only the outer shroud 60o will be described below.

As illustrated in FIGS. 3 and 4, the outer shroud 60o includes an outer shroud body 61 that has a plate shape and that extends in the axial direction Da and the circumferential direction Dc, and a peripheral wall 65 that protrudes from the outer shroud body 61 to the radial outer side Dro along a peripheral edge of the outer shroud body 61.

The outer shroud body 61 is provided with a front end surface 62f that is an end surface on the axial upstream side Dau, a rear end surface 62b that is an end surface on the axial downstream side Dad, a pressure-side end surface 63p that is an end surface on the circumferential pressure-side Dcp, a suction-side end surface 63n that is an end surface on the circumferential suction side Dcn, and a gas path surface 64 that faces the radial inner side Dri. The front end surface 62f is substantially parallel to the rear end surface 62b. In addition, the pressure-side end surface 63p is substantially parallel to the suction-side end surface 63n. Thus, as illustrated in FIG. 4, as viewed from the radial direction Dc, the outer shroud body 61 forms a parallelogram shape.

The peripheral wall 65 includes a front peripheral wall 65f and a rear peripheral wall 65b that face each other in the axial direction Da, and a pair of side peripheral walls 65p, 65n that face each other in the circumferential direction Dc. Any of the front peripheral wall 65f and the rear peripheral wall 65b protrudes further than the outer shroud body 61 toward the radial outer side Dro than the pair of side peripheral walls 65p, 65n to form a hook portion. The front peripheral wall 65f and the rear peripheral wall 65b that form the hook portion serve to attach the stator vane 50 to the inner circumferential side of the turbine casing 45 (see FIG. 2). In the outer shroud 60o, the outer shroud body 61 and the peripheral wall 65 form a recessed portion 66 recessed toward the radial inner side Dri.

The stator vane 50 further includes an impingement plate 67 that divides the recessed portion 66 of the outer shroud 60o into a region on the radial outer side Dro and an inner cavity 69 that is a region on the radial inner side Dri. This impingement plate 67 is provided with a plurality of air holes 68 penetrating the impingement plate 67 in the radial direction Dr. The inner cavity 69 receives, through the air holes 68 of this impingement plate 67, a portion of cooling air Ac that is present on the radial outer side Dro of the stator vane 50. This inner cavity 69 is formed in a region surrounded by the front end surface 62f, the rear end surface 62b, the suction-side end surface 63n, and the pressure-side end surface 63p.

A plurality of vane air passages 71 extending in the radial direction Dc are formed in the vane body 51, the outer shroud 60o, and the inner shroud 60i. Each of the vane air passages 71 is continuously formed from the outer shroud 60o through the vane body 51 to the inner shroud 60i. The plurality of vane air passages 71 are aligned along a camber line of the vane body 51. The vane air passages 71 adjacent to each other partially communicate with each other at a portion on the radial outer side Dro or at a portion on the radial inner side Dri. In addition, some of the plurality of vane air passages 71 open at a bottom of the recessed portion 66 in the outer shroud 60o. Further, some of the plurality of vane air passages 71 open at a bottom of a recessed portion in the inner shroud 60i. The vane air passages 71 receive, from the openings of these vane air passages 71, a portion of the cooling air Ac that is present on the radial outer side Dro or the radial inner side Dri of the stator vane 50. A plurality of vane surface ejection passages 72 penetrating the combustion gas flow path 49 from the vane air passages 71 are formed in the front edge 52 and the rear edge 53 of the vane body 51.

As illustrated in FIG. 4, among the pair of side peripheral walls 65p, 65n of the outer shroud 60o, the side peripheral wall 65p of the circumferential pressure-side Dcp includes a pressure-side passage 73p extending in a direction including an axial direction Da component along the pressure-side end surface 63p. In addition, the side peripheral wall 65n of the circumferential suction side Dcn is provided with a suction-side passage 73n extending in a direction including the axial direction Da component along the suction-side end surface 63n. Any of the pressure-side passage 73p and the suction-side passage 73n communicates with the inner cavity 69 at an upstream end of any of the pressure-side passage 73p and the suction-side passage 73n. In addition, any of the pressure-side passage 73p and the suction-side passage 73n opens at the rear end surface 62b of the outer shroud body 61 at a downstream end of any of the pressure-side passage 73p and the suction-side passage 73n. The outer shroud body 61 is provided with a plurality of rear-end passages 76 disposed between the suction-side passage 73n and the pressure-side passage 73p on the axial downstream side Dad with respect to the inner cavity 69. The plurality of rear-end passages 76 are aligned in the circumferential direction (lateral direction) Dc. Any of the plurality of rear-end passages 76 communicates with the inner cavity 69 and opens at the rear end surface 62b.

Among the plurality of rear-end passages 76, a rear-end passage 76 closest to the suction-side passage 73n in the circumferential direction (lateral direction) Dc, in other words, close to the suction-side end surface 63n is a suction-side first rear-end passage 76n1. This suction-side first rear-end passage 76n1 gradually extends closer to the suction-side passage 73n toward the axial downstream side Dad. In addition, among the plurality of rear-end passages 76, a rear-end passage 76 closest to the pressure-side passage 73p in the circumferential direction (lateral direction) Dc, in other words, close to the pressure-side end surface 63p is a pressure-side first rear-end passage 76p1. This pressure-side first rear-end passage 76p1 gradually extends closer to the pressure-side passage 73p toward the axial downstream side Dad.

A plurality of the rear-end passages 76 that include the suction-side first rear-end passage 76n1 and are continuously aligned from the suction-side first rear-end passage 76n1 to the circumferential pressure-side (lateral direction) Dcp constitute a suction-side rear-end passage group 75n. In addition, a plurality of the rear-end passages 76 that include the pressure-side first rear-end passage 76p1 and are continuously aligned from the pressure-side first rear-end passage 76p1 to the circumferential suction-side (lateral direction) Dcn constitute a pressure-side rear-end passage group 75p. In the present embodiment, all the rear-end passages 76 belong to any one of the suction-side rear-end passage group 75n and the pressure-side rear-end passage group 75p.

A plurality of rear-end passages 76n that constitute the suction-side rear-end passage group 75n are parallel to each other. Thus, any of the plurality of rear-end passages 76n that constitute the suction-side rear-end passage group 75n gradually extends closer to the suction-side passage 73n toward the axial downstream side Dad. In addition, a plurality of rear-end passages 76p that constitute the pressure-side rear-end passage group 75p are also parallel to each other. Thus, any of the plurality of rear-end passages 76p that constitute the pressure-side rear-end passage group 75p gradually extends closer to the pressure-side passage 73p toward the axial downstream side Dad.

The combustion gas G flows between the outer shroud 60o and the inner shroud 60i of the stator vane 50. Therefore, the vane body 51 disposed between the outer shroud 60o and the inner shroud 60i is heated with this combustion gas G. This vane body 51 is cooled with the cooling air Ac while this cooling air Ac flows through the vane air passages 71. In addition, the cooling air Ac that the vane air passages 71 have received flows out of these vane surface ejection passages 72 into the combustion gas flow path 49. Therefore, the front edge 52 and the rear edge 53 of the vane body 51 are cooled with the cooling air Ac while this cooling air Ac flows out of the vane surface ejection passages 72. Further, a portion of the cooling air Ac that has flowed out of the vane surface ejection passages 72 to the combustion gas flow path 49 partially covers a surface of the vane body 51 and serves as film air.

In addition, the gas path surface 64 of the outer shroud 60o and a gas path surface of the inner shroud 60i are also heated with the combustion gas G. As described above, the outer shroud 60o and the inner shroud 60i include the essentially same structure. Therefore, a method of cooling the outer shroud 60o is basically the same as a method of cooling the inner shroud 60i. Then, only the method of cooling the outer shroud 60o will be described below.

The inner cavity 69 receives, through the plurality of air holes 68 of the impingement plate 67, the cooling air Ac that is present on the radial outer side Dro of the outer shroud 60o. The cooling air Ac ejected from the plurality of air holes 68 of the impingement plate 67 impinges on a bottom surface of the recessed portion 66 of the outer shroud 60o, and this bottom surface is subjected to impingement cooling.

As a result, a region including a region corresponding to the bottom surface of the recessed portion 66 in the gas path surface 64 of the outer shroud 60o is cooled by the impingement cooling of the bottom surface.

The pressure-side passage 73p receives a portion of the cooling air Ac that the inner cavity 69 of the outer shroud 60o has received, and the portion of the cooling air Ac flows out through the opening of the rear end surface 62b. A region located along the pressure-side end surface 63p in the gas path surface 64 of the outer shroud 60o is cooled with the cooling air Ac while this cooling air Ac flows through the pressure-side passage 73p. The suction-side passage 73n receives another portion of the cooling air Ac that the inner cavity 69 of the outer shroud 60o has received, and another portion of the cooling air Ac flows out through the opening of the rear end surface 62b. In the gas path surface 64 of the outer shroud 60o, a region located along the suction-side end surface 63n is cooled with the cooling air Ac while this cooling air Ac flows through the suction-side passage 73n.

The plurality of rear-end passages 76 receive still another portion of the cooling air Ac that the inner cavity 69 of the outer shroud 60o has received, and still another portion of the cooling air Ac flows out through the opening of the rear end surface 62b. A region located along the rear end surface 62b in the gas path surface 64 of the outer shroud 60o is cooled with the cooling air Ac while this cooling air Ac flows through the plurality of rear-end passages 76. Note that, a region located along the suction-side end surface 63n and the rear end surface 62b in the gas path surface 64 of the outer shroud 60o is cooled with the cooling air Ac flowing through the suction-side passage 73n. In addition, a region located along the pressure-side end surface 63p and the rear end surface 62b in the gas path surface 64 of the outer shroud 60o is cooled with the cooling air Ac flowing through the pressure-side passage 73p.

Meanwhile, a wake Gw of the combustion gas G is formed in a region located on the downstream side of the rear edge 53 of the vane body 51 along the camber line. This wake Gw increases a heat transfer coefficient between the combustion gas G and the outer shroud 60o. Therefore, the region located on the downstream side of the rear edge 53 of the vane body 51 along the camber line in the gas path surface 64 is easily heated with the combustion gas G In other words, a portion of a region located along the rear end surface 62b on the circumferential pressure-side Dcp in the gas path surface 64 is easily heated with the combustion gas G. A wake region formed due to the vane body 51 of a first stator vane 50 extends into a region located along the rear end surface 62b on the circumferential suction-side Dcn in the gas path surface 64 of a second stator vane 50 adjacent to the circumferential pressure-side Dcp of the first stator vane 50. Thus, a portion of the region located along the rear end surface 62b on the circumferential suction-side Dcn in the gas path surface 64 is easily heated with the combustion gas G.

Further, when the pressure-side passage 73p and the pressure-side first rear-end passage 76p1 are parallel to each other, an uncooled region between both the passages 73p, 76p1 in the circumferential direction Dc becomes wider. Therefore, the region between both the passages 73p, 76p1 in the circumferential direction Dc is easily heated with the combustion gas G In addition, when the suction-side passage 73n and the suction-side first rear-end passage 76n1 are parallel to each other, an uncooled region between both the passages 73n, 76n1 in the circumferential direction Dc also becomes wider. Therefore, the region between both the passages 73n, 76n1 in the circumferential direction Dc is also easily heated with the combustion gas G.

The suction-side first rear-end passage 76n1 in the present embodiment gradually extends closer to the suction-side passage 73n toward the axial downstream side Dad. Therefore, in the present embodiment, in the rear end surface 62b, a distance between a position where the suction-side passage 73n opens and a position where the suction-side first rear-end passage 76n1 opens is shorter than the distance in the case where the suction-side first rear-end passage 76n1 is parallel to the suction-side passage 73n. Therefore, in the present embodiment, the cooling capacity in the region located along the rear end surface 62b on the circumferential pressure-side Dcp in the gas path surface 64 is enhanced.

The pressure-side first rear-end passage 76p1 in the present embodiment gradually extends closer to the pressure-side passage 73p toward the axial downstream side Dad. Therefore, in the present embodiment, in the rear end surface 62b, a distance between a position where the pressure-side passage 73p opens and a position where the pressure-side first rear-end passage 76p1 opens is shorter than the distance in the case where the pressure-side first rear-end passage 76p1 is parallel to the pressure-side passage 73p. Therefore, in the present embodiment, the cooling capacity in the region located along the rear end surface 62b on the circumferential suction-side Dcn in the gas path surface 64 is enhanced.

In the present embodiment, any of the plurality of rear-end passages 76n that constitute the suction-side rear-end passage group 75n gradually extends closer to the suction-side passage 73n toward the axial downstream side Dad. In addition, in the present embodiment, any of the plurality of rear-end passages 76p that constitute the pressure-side rear-end passage group 75p gradually extends closer to the pressure-side passage 73p toward the axial downstream side Dad. Therefore, a distance between a position where the rear-end passage 76n closest to the circumferential pressure-side Dcp among the plurality of rear-end passages 76n that constitute the suction-side rear-end passage group 75n opens and a position where the rear-end passage 76p closest to the circumferential suction side Dcn among the plurality of rear-end passages 76p that constitute the pressure-side rear-end passage group 75p opens is longer than the distance in the case where both the rear-end passages 76n, 76p are parallel to each other. In other words, a gap between a position where the rear-end passage 76n closest to the pressure-side passage 73p among the plurality of rear-end passages 76n that constitute the suction-side rear-end passage group 75n opens and a position where the rear-end passage 76p closest to the suction-side passage 73n among the plurality of rear-end passages 76p that constitute the pressure-side rear-end passage group 75p opens is larger than the gap in the case where both the rear-end passages 76n, 76p are parallel to each other. Therefore, in the present embodiment, the cooling capacity in a central region located along the rear end surface 62b in the circumferential direction Dc in the gas path surface 64 lowers. However, the central region located along the rear end surface 62b in the circumferential direction Dc in the gas path surface 64 is less affected by the wake described above and thus, the central region is less likely to be heated than the region located along the rear end surface 62b on the circumferential suction side Dcn and the region located along the rear end surface 62b on the circumferential pressure-side Dcp in the gas path surface 64. Thus, in the present embodiment, even when the cooling capacity in the central region located along the rear end surface 62b in the circumferential direction in the gas path surface 64 lowers, the durability in this region does not lower.

As described above, in the present embodiment, since the cooling capacity in a region that is easily heated is enhanced and the cooling capacity in a region that is relatively less likely to be heated is lowered, the stator vanes 50 can be cooled effectively. Thus, according to the present embodiment, it is possible to suppress an increase in an amount of air used for cooling the stator vane 50 while improving the durability of this stator vane 50.

The plurality of rear-end passages 76 in the present embodiment can be formed, for example, by electric-discharge machining. In this electric-discharge machining, wire on a straight line is used as an electrode, and the wire is moved in a direction in which the wire extends, and a base material is machined into the rear-end passages 76. When the plurality of rear-end passages 76 are parallel to each other, the same number of lines of wire as the number of these rear-end passages 76 can be disposed parallel to each other, and the plurality of rear-end passages 76 can be formed together by moving these lines of wire together.

In the present embodiment, not all of the rear-end passages 76 are parallel to each other. However, in the present embodiment, all of the rear-end passages 76 belong to any of the suction-side rear-end passage group 75n and the pressure-side rear-end passage group 75p, the plurality of rear-end passages 76n that constitute the suction-side rear-end passage group 75n are parallel to each other, and the plurality of rear-end passages 76p that constitute the pressure-side rear-end passage group 75p are parallel to each other. Therefore, in the present embodiment, it is possible to suppress time and effort to machine the plurality of rear-end passages 76 as compared to the case where the plurality of rear-end passages 76 extend in different directions.

Second Embodiment of Stator Vane

Figure 5:
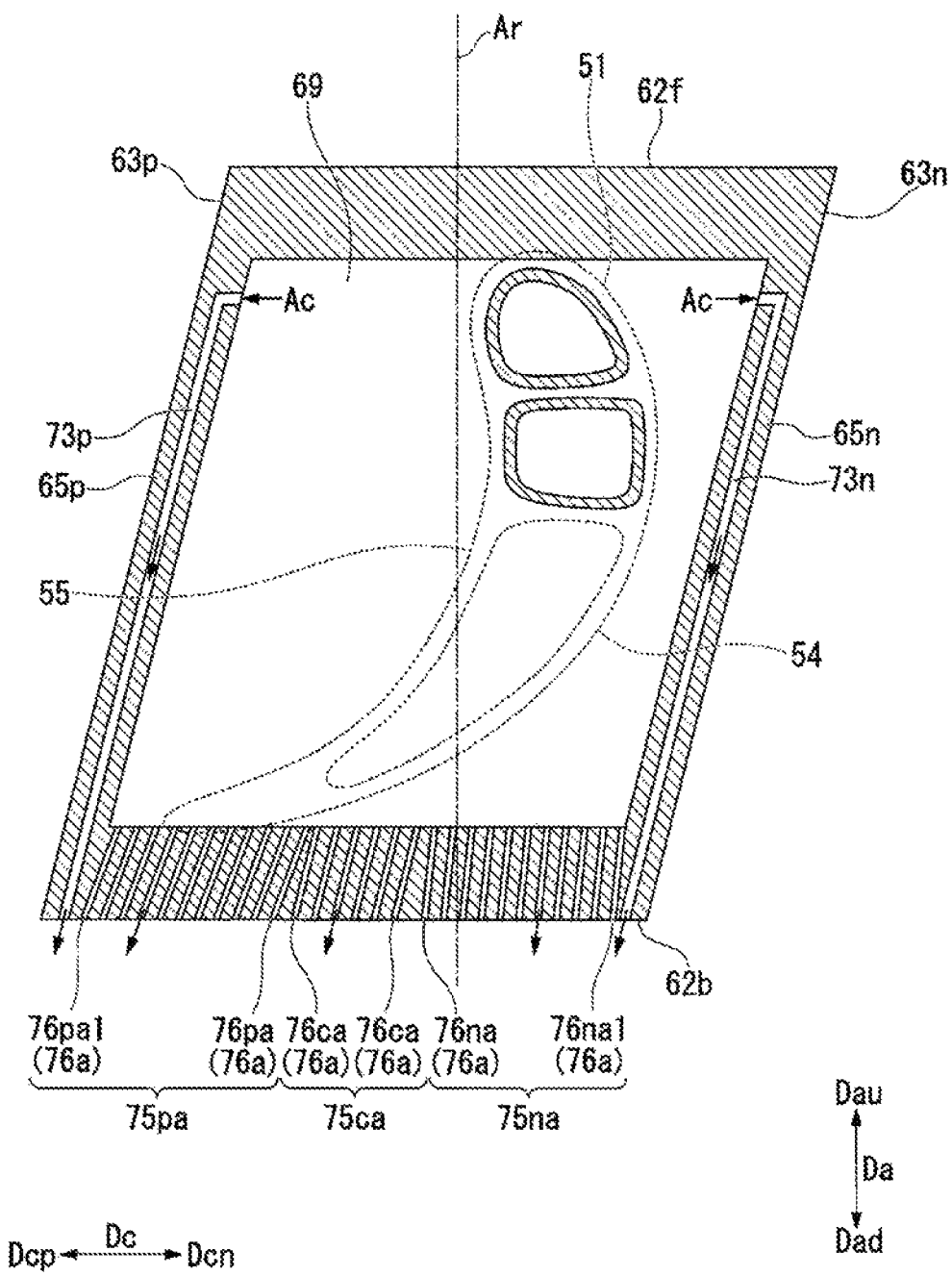
FIG. 5 is a cross-sectional view of a stator vane according to a second embodiment of the present invention.

A stator vane according to a second embodiment of the present invention will be described below with reference to FIG. 5.

The stator vane in the present embodiment includes the same configuration as the configuration of the stator vane in the first embodiment except that the arrangement or the like of the plurality of rear-end passages 76 of the stator vane in the first embodiment is changed.

The stator vane in the present embodiment includes a suction-side rear-end passage group 75na, a central rear-end passage group 75ca, and a pressure-side rear-end passage group 75pa, as rear-end passage groups. All of a plurality of rear-end passages 76a belong to any of the suction-side rear-end passage group 75na, the central rear-end passage group 75ca, and the pressure-side rear-end passage group 75pa.

The suction-side rear-end passage group 75na includes a suction-side first rear-end passage 76na1, and a plurality of rear-end passages 76na that are aligned to extend from this suction-side first rear-end passage 76na1 to the circumferential pressure-side (lateral direction) Dcp. The plurality of rear-end passages 76na that constitute this suction-side rear-end passage group 75na are parallel to each other, and any of the plurality of rear-end passages 76na gradually extends closer to a suction-side passage 73n toward the axial downstream side Dad.

The pressure-side rear-end passage group 75pa includes a pressure-side first rear-end passage 76pa1, and a plurality of rear-end passages 76pa that are aligned to extend from this pressure-side first rear-end passage 76pa1 to the circumferential suction side (lateral direction) Dcn. The plurality of rear-end passages 76pa that constitute this pressure-side rear-end passage group 75pa are parallel to each other, and any of the plurality of rear-end passages 76pa gradually extends closer to a pressure-side passage 73p toward the axial downstream side Dad.

The central rear-end passage group 75ca is disposed between the suction-side rear-end passage group 75na and the pressure-side rear-end passage group 75pa in the circumferential direction (lateral direction) Dc. The central rear-end passage group 75ca includes a plurality of rear-end passages 76ca that are parallel to each other. An angle of each of the plurality of rear-end passages 76ca that constitutes the central rear-end passage group 75ca with respect to the pressure-side passage 73p or the suction-side passage 73n is an angle between an angle of each of the plurality of rear-end passages 76na that constitute the suction-side rear-end passage group 75na with respect to the pressure-side passage 73p or the suction-side passage 73n, and an angle of each of the plurality of rear-end passages 76pa that constitute the pressure-side rear-end passage group 75pa with respect to the pressure-side passage 73p or the suction-side passage 73n. In the present embodiment, the angle of each of the plurality of rear-end passages 76ca that constitute the central rear-end passage group 75ca with respect to the pressure-side passage 73p or the suction-side passage 73n is 0 degree. In other words, in the present embodiment, the plurality of rear-end passages 76ca that constitute the central rear-end passage group 75ca are parallel to the pressure-side passage 73p, the suction-side passage 73n, a pressure-side end surface 63p, and a suction-side end surface 63n.

As described above, similarly in the present embodiment, as with the first embodiment, the plurality of rear-end passages 76pa that constitute the pressure-side rear-end passage group 75pa gradually extend closer to the pressure-side passage 73p toward the axial downstream side Dad. In addition, the plurality of rear-end passages 76na that constitute the suction-side rear-end passage group 75na gradually extend closer to the suction-side passage 73n toward the axial downstream side Dad. Therefore, similarly in the present embodiment, as with the first embodiment, since the cooling capacity in a region that is easily heated, that is, a region located along a rear end surface 62b on the circumferential suction side Dcn and a region on the circumferential pressure-side Dcp in a gas path surface 64 is enhanced, and the cooling capacity in a region that is relatively less likely to be heated is lowered, a stator vane 50 can be cooled effectively. Thus, similarly in the present embodiment, it is possible to suppress an increase in an amount of air used for cooling the stator vane while improving the durability of this stator vane.

A central region between the region located along the rear end surface 62b on the circumferential suction side Dcn and the region on the circumferential pressure-side Dcp in the gas path surface 64 is mainly cooled with cooling air Ac flowing through the plurality of rear-end passages 76ca that constitute the central rear-end passage group 75ca.

Meanwhile, a gap between a position where a rear-end passage 76na closest to the pressure-side passage 73p among the plurality of rear-end passages 76na that constitute the suction-side rear-end passage group 75na opens and a position where a rear-end passage 76ca closest to the suction-side passage 73n among the plurality of rear-end passages 76ca that constitute the central rear-end passage group 75ca opens is larger than the gap in the case where both the rear-end passages 76na, 76ca are parallel to each other. In addition, a gap between a position where a rear-end passage 76*pa* closest to the suction-side passage 73*n* among the plurality of rear-end passages 76*pa* that constitute the pressure-side rear-end passage group 75*pa* opens and a position where a rear-end passage 76*ca* closest to the pressure-side passage 73*p* among the plurality of rear-end passages 76*ca* that constitute the central rear-end passage group 75*ca* opens is larger than the gap in the case where both the rear-end passages 76*na*, 76*ca* are parallel to each other. Therefore, in the present embodiment, the cooling capacity in these gap regions located along the rear end surface 62*b* in the gas path surface 64 lowers. However, these gap regions located along the rear end surface 62*b* in the gas path surface 64 are less affected by the wake described above and thus, the gap regions are less likely to be heated than the region located along the rear end surface 62*b* on the circumferential suction side Dcn and the region located along the rear end surface 62*b* on the circumferential pressure-side Dcp in the gas path surface 64. Thus, in the present embodiment, even when the cooling capacity in these gap regions located along the rear end surface 62*b* in the gas path surface 64 lowers, the durability in these gap regions does not lower.

In addition, in the present embodiment, all of the rear-end passages 76*a* belong to any of the suction-side rear-end passage group 75*na*, the pressure-side rear-end passage group 75*pa*, and the central rear-end passage group 75*ca*. Moreover, the plurality of rear-end passages 76*na* that constitute the suction-side rear-end passage group 75*na* are parallel to each other, the plurality of rear-end passages 76*pa* that constitute the pressure-side rear-end passage group 75*pa* are parallel to each other, and the plurality of rear-end passages 76*ca* that constitute the central rear-end passage group 75*ca* are parallel to each other. Therefore, in the present embodiment, it is possible to suppress time and effort to machine the plurality of rear-end passages 76*a* as compared to the case where the plurality of rear-end passages 76*a* extend in different directions.

Note that the stator vane in the first embodiment includes the two rear-end passage groups 75*n*, 75*p*, while the stator vane in the present embodiment includes the three rear-end passage groups 75*na*, 75*ca*, 75*pa*. Therefore, it takes more time and effort in the present embodiment to machine the plurality of rear-end passages 76*a* than in the first embodiment. However, in the present embodiment, since the two gaps are aligned in the circumferential direction Dc, the gap between the two rear-end passage groups 75*na*, 75*ca* (75*ca*, 75*pa*) adjacent to each other in the circumferential direction Dc can be smaller than the gap between the two rear-end passage groups 75*n*, 75*p* adjacent to each other in the circumferential direction Dc in the first embodiment.

Third Embodiment of Stator Vane

Figure 6:
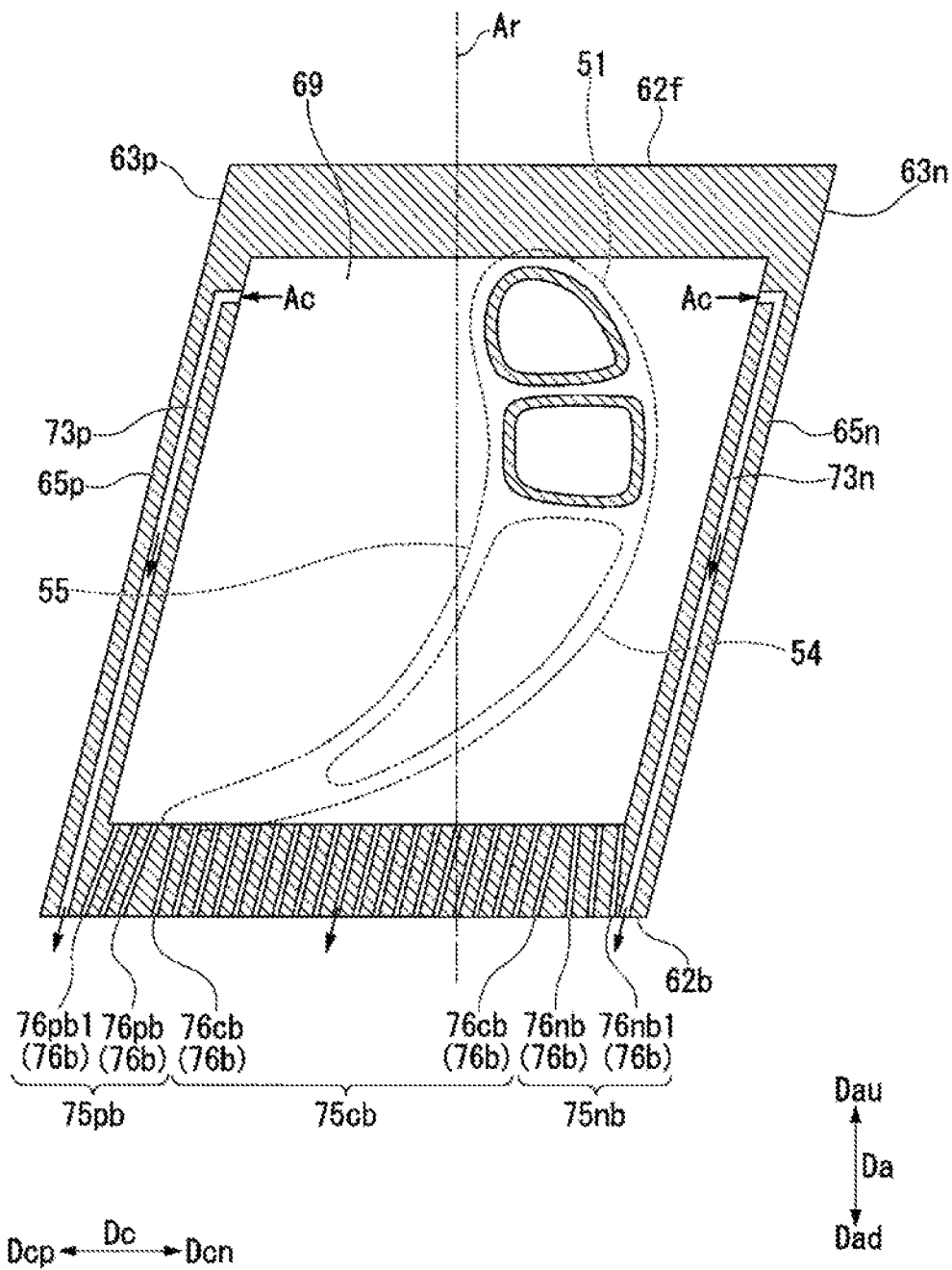
FIG. 6 is a cross-sectional view of a stator vane according to a third embodiment of the present invention.

A stator vane according to a third embodiment of the present invention will be described below with reference to FIG. 6.

The stator vane in the present embodiment is a modification of the stator vane in the second embodiment. As with the stator vane in the second embodiment, the stator vane in the present embodiment also includes a suction-side rear-end passage group 75*nb*, a central rear-end passage group 75*cb*, and a pressure-side rear-end passage group 75*pb*, as rear-end passage groups. As with the stator vane in the second embodiment, all of a plurality of rear-end passages 76*b* belong to any of the suction-side rear-end passage group 75*nb*, the central rear-end passage group 75*cb*, and the pressure-side rear-end passage group 75*pb*.

As with the suction-side rear-end passage group 75*na* in the second embodiment, the suction-side rear-end passage group 75*nb* in the present embodiment also includes a suction-side first rear-end passage 76*nb*1, and a plurality of rear-end passages 76*nb* that are aligned to extend from this suction-side first rear-end passage 76*nb*1 toward the circumferential pressure-side (lateral direction) Dcp. The plurality of rear-end passages 76*nb* that constitute this suction-side rear-end passage group 75*nb* are parallel to each other, and any of the plurality of rear-end passages 76*nb* gradually extends closer to a suction-side passage 73*n* toward the axial downstream side Dad. However, the number of the plurality of rear-end passages 76*nb* that constitute the suction-side rear-end passage group 75*nb* in the present embodiment is smaller than the number of the plurality of rear-end passages 76*na* that constitute the suction-side rear-end passage group 75*na* in the second embodiment.

As with the pressure-side rear-end passage group 75*pa* in the second embodiment, the pressure-side rear-end passage group 75*pb* in the present embodiment also includes a pressure-side first rear-end passage 76*pb*1, and a plurality of rear-end passages 76*pb* that are aligned to extend from this pressure-side first rear-end passage 76*pb*1 to the circumferential suction side (lateral direction) Dcn. The plurality of rear-end passages 76*pb* that constitute this pressure-side rear-end passage group 75*pb* are parallel to each other, and any of the plurality of rear-end passages 76*pb* gradually extends closer to a pressure-side passage 73*p* toward the axial downstream side Dad. However, the number of the plurality of rear-end passages 76*pb* that constitute the pressure-side rear-end passage group 75*pb* in the present embodiment is smaller than the number of the plurality of rear-end passages 76*pa* that constitute the pressure-side rear-end passage group 75*pa* in the second embodiment.

As with the central rear-end passage group 75*ca* in the second embodiment, the central rear-end passage group 75*cb* in the present embodiment is disposed between the suction-side rear-end passage group 75*nb* and the pressure-side rear-end passage group 75*pb* in the circumferential direction (lateral direction) Dc. The central rear-end passage group 75*cb* includes a plurality of rear-end passages 76*cb* that are parallel to each other. An angle of each of the plurality of rear-end passages 76*cb* that constitute the central rear-end passage group 75*cb* with respect to the pressure-side passage 73*p* or the suction-side passage 73*n* is an angle between an angle of each of the plurality of rear-end passages 76*nb* that constitute the suction-side rear-end passage group 75*nb* with respect to the pressure-side passage 73*p* or the suction-side passage 73*n*, and an angle of each of the plurality of rear-end passages 76*pb* that constitute the pressure-side rear-end passage group 75*pb* with respect to the pressure-side passage 73*p* or the suction-side passage 73*n*. However, the number of the plurality of rear-end passages 76*cb* that constitute the central rear-end passage group 75*cb* in the present embodiment is larger than the number of the plurality of rear-end passages 76*ca* that constitute the central rear-end passage group 75*ca* in the second embodiment.

That is, in the stator vane in the present embodiment, the number of the rear-end passages 76*na* that constitute the suction-side rear-end passage group 75*na* and the number of the rear-end passages 76*pa* that constitute the pressure-side rear-end passage group 75*pa* in the stator vane in the second embodiment are decreased, while the number of the rear-end passages 76*ca* that constitute the central rear-end passage group 75*ca* in the stator vane in the second embodiment is increased.

As described above, the number of the rear-end passages 76*nb* that constitute the suction-side rear-end passage group 75*nb*, the number of the rear-end passages 76*pb* that constitute the pressure-side rear-end passage group 75*pb*, and the number of the rear-end passages 76*cb* that constitute the central rear-end passage group 75*cb* may be changed appropriately depending on a shape and the like of a vane body 51.

Fourth Embodiment of Stator Vane

Figure 7:
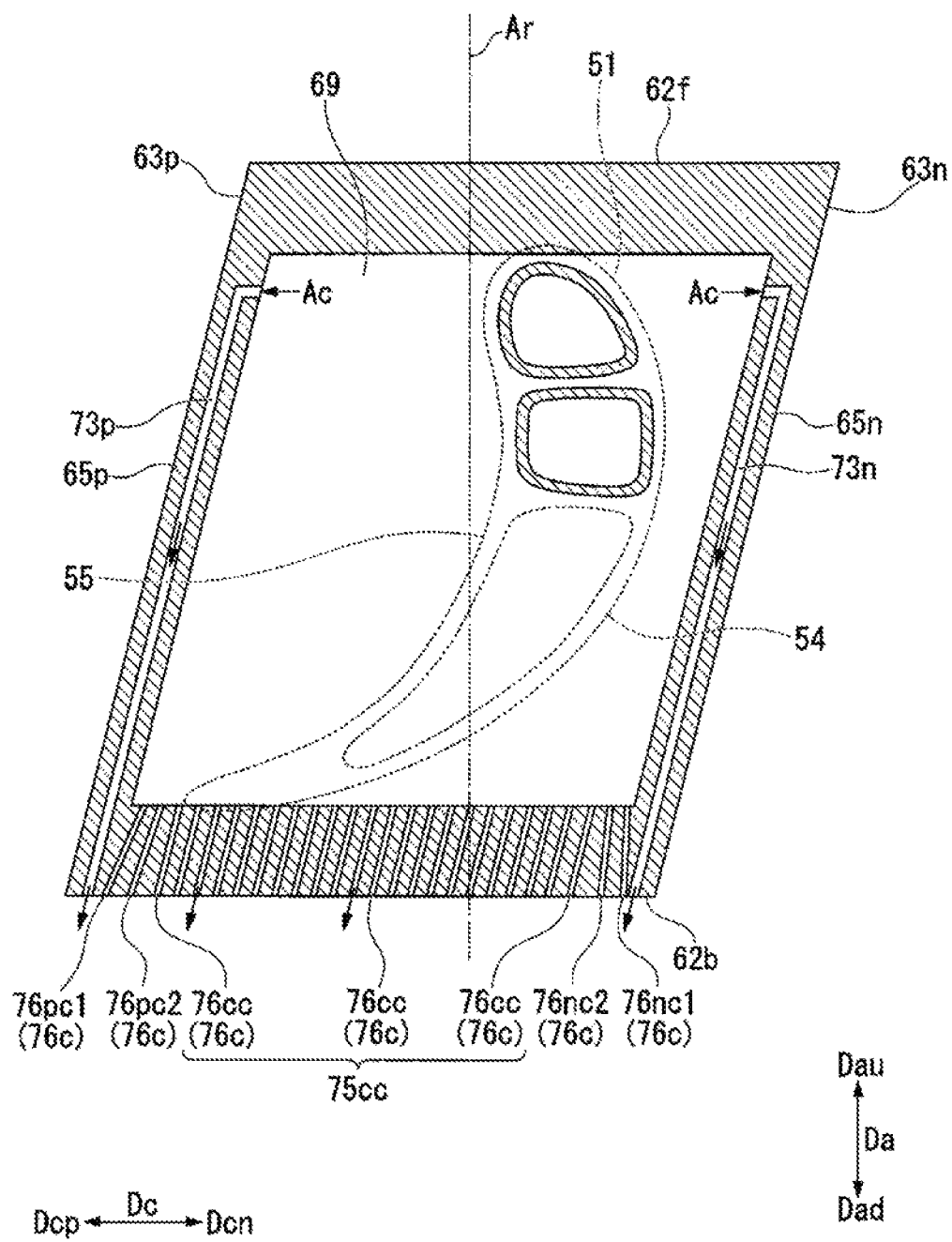
FIG. 7 is a cross-sectional view of a stator vane according to a fourth embodiment of the present invention.

A stator vane according to a fourth embodiment of the present invention will be described below with reference to FIG. 7.

The stator vane in the present embodiment includes the same configuration as the configuration of the stator vane in the first embodiment except that the arrangement or the like of the plurality of rear-end passages 76 of the stator vane in the first embodiment is changed. All of the plurality of rear-end passages of the stator vanes in the above-described embodiments belong to any of a plurality of the rear-end passage groups. In the present embodiment, among a plurality of rear-end passages 76*c*, some of the plurality of rear-end passages 76*c* belong to a rear-end passage group, and the remaining of the rear-end passages 76*c* does not belong to a rear-end passage group.

The stator vane in the present embodiment includes a suction-side first rear-end passage 76*nc*1, a suction-side second rear-end passage 76*nc*2, a plurality of rear-end passages 76*cc* that constitute a central rear-end passage group 75*cc*, a pressure-side first rear-end passage 76*pc*1, and a pressure-side second rear-end passage 76*pc*2, as the rear-end passages 76*c*. In the present embodiment, among the plurality of rear-end passages 76*c*, the suction-side first rear-end passage 76*nc*1, the suction-side second rear-end passage 76*nc*2, the pressure-side first rear-end passage 76*pc*1, and the pressure-side second rear-end passage 76*pc*2 do not belong to a rear-end passage group.

In the present embodiment, among the plurality of rear-end passages 76*c*, a rear-end passage 76*c* closest to a suction-side passage 73*n* in the circumferential direction (lateral direction) Dc is the suction-side first rear-end passage 76*nc*1. This suction-side first rear-end passage 76*nc*1 gradually extends closer to a suction-side passage 73*n* toward the axial downstream side Dad.

The suction-side second rear-end passage 76*nc*2 is a rear-end passage 76*c* closest to the suction-side first rear-end passage 76*nc*1 in the circumferential direction (lateral direction) Dc among the plurality of rear-end passages 76*c*. This suction-side second rear-end passage 76*nc*2 also gradually extends closer to the suction-side passage 73*n* toward the axial downstream side Dad. However, an amount of displacement of this suction-side second rear-end passage 76*nc*2 toward the suction-side passage 73*n* with respect to a unit displacement amount toward the axial downstream side Dad is smaller than the amount of displacement of the suction-side first rear-end passage 76*nc*1. In other words, an angle of the suction-side second rear-end passage 76*nc*2 with respect to the suction-side passage 73*n* is smaller than an angle of the suction-side first rear-end passage 76*nc*1 with respect to the suction-side passage 73*n*.

Similarly in the present embodiment, a rear-end passage 76*c* closest to a pressure-side passage 73*p* in the circumferential direction (lateral direction) Dc among the plurality of rear-end passages 76*c* is the pressure-side first rear-end passage 76*pc*1. This pressure-side first rear-end passage 76*pc*1 gradually extends closer to the pressure-side passage 73*p* toward the axial downstream side Dad.

The pressure-side second rear-end passage 76*pc*2 is a rear-end passage 76*c* closest to the pressure-side first rear-end passage 76*pc*1 in the circumferential direction (lateral direction) Dc among the plurality of rear-end passages 76*c*. This pressure-side second rear-end passage 76*pc*2 also gradually extends closer to the pressure-side passage 73*p* toward the axial downstream side Dad. However, an amount of displacement of this pressure-side second rear-end passage 76*pc*2 toward the pressure-side passage 73*p* with respect to the unit displacement amount toward the axial downstream side Dad is smaller than the amount of displacement of the pressure-side first rear-end passage 76*pc*1. In other words, an angle of the pressure-side second rear-end passage 76*pc*2 with respect to the pressure-side passage 73*p* is smaller than an angle of the pressure-side first rear-end passage 76*pc*1 with respect to the pressure-side passage 73*p*.

Any of the plurality of rear-end passages 76*cc* that constitute the central rear-end passage group 75*cc* is disposed between the suction-side second rear-end passage 76*nc*2 and the pressure-side second rear-end passage 76*pc*2 in the circumferential direction (lateral direction) Dc. The plurality of rear-end passages 76*cc* that constitute this central rear-end passage group 75*cc* are parallel to each other. An angle of each of the plurality of rear-end passages 76*cc* that constitute the central rear-end passage group 75*cc* with respect to the pressure-side passage 73*p* or the suction-side passage 73*n* is an angle between an angle of the suction-side second rear-end passage 76*nc*2 with respect to the pressure-side passage 73*p* or the suction-side passage 73*n* and an angle of the pressure-side second rear-end passage 76*pc*2 with respect to the pressure-side passage 73*p* or the suction-side passage 73*n*.

As described above, similarly in the present embodiment, as with the above-described embodiments, the pressure-side first rear-end passage 76*pc*1 gradually extends closer to the pressure-side passage 73*p* toward the axial downstream side Dad. In addition, the suction-side first rear-end passage 76*nc*1 gradually extends closer to the suction-side passage 73*n* toward the axial downstream side Dad. Therefore, similarly in the present embodiment, as with the above-described embodiments, since the cooling capacity in a region that is easily heated, that is, a region located along a rear end surface 62*b* on the circumferential suction side Dcn and a region on the circumferential pressure-side Dcp in a gas path surface 64 is enhanced, and the cooling capacity of a region that is relatively less likely to be heated is lowered, the stator vane can be cooled effectively. Thus, similarly in the present embodiment, it is possible to suppress an increase in an amount of air used for cooling the stator vane while improving the durability of this stator vane.

A central region between the region located along the rear end surface 62*b* on the circumferential suction side Dcn and the region on the circumferential pressure-side Dcp in the gas path surface 64 is mainly cooled with cooling air Ac flowing through the plurality of rear-end passages 76*cc* that constitute the central rear-end passage group 75*cc*.

Meanwhile, a gap between a position where the suction-side second rear-end passage 76*nc*2 opens and a position where a rear-end passage 76*cc* closest to the suction-side passage 73*n* among the plurality of rear-end passages 76*cc* that constitute the central rear-end passage group 75*cc* opens is larger than the gap in the case where both the rear-end passages 76*nc*2, 76*cc* are parallel to each other. In addition, a gap between a position where the pressure-side second rear-end passage 76*pc*2 opens and a position where a rear-end passage 76*cc* closest to the pressure-side passage 73*p* among the plurality of rear-end passages 76*cc* that constitute the central rear-end passage group 75cc opens is larger than the gap in the case where both the rear-end passages 76pc2, 76cc are parallel to each other. Therefore, in the present embodiment, the cooling capacity in these gap regions located along the rear end surface 62b in the gas path surface 64 lowers. However, these gap regions located along the rear end surface 62b in the gas path surface 64 are less affected by the wake described above and thus, the gap regions are less likely to be heated than the region located along the rear end surface 62b on the circumferential suction side Dcn and the region located along the rear end surface 62b on the circumferential pressure-side Dcp in the gas path surface 64. Thus, in the present embodiment, even when the cooling capacity in these gap regions located along the rear end surface 62b in the gas path surface 64 lowers, the durability of these gap regions does not lower.

In the present embodiment, among the plurality of rear-end passages 76nc1, 76nc2 that are present on the circumferential suction side Dcn with respect to the central rear-end passage group 75cc, the rear-end passage 76nc1 closer to the suction-side passage 73n has a larger amount of displacement toward the suction-side passage 73n with respect to the unit displacement amount toward the axial downstream side Dad. In addition, in the present embodiment, among the plurality of rear-end passages 76pc1, 76pc2 that are present on the circumferential pressure-side Dcp with respect to the central rear-end passage group 75cc, the rear-end passage 76pc1 closer to the pressure-side passage 73p has a larger amount of displacement toward the pressure-side passage 73p with respect to the unit displacement amount toward the axial downstream side Dad. Therefore, in the present embodiment, a maximum distance between positions where any two rear-end passages 76c adjacent to each other in the circumferential direction (lateral direction) Dc open can be smaller than the maximum distance in any of the above-described embodiments in which all of the plurality of rear-end passages belong to any of the rear-end passage groups.

Fifth Embodiment of Stator Vane

Figure 8:
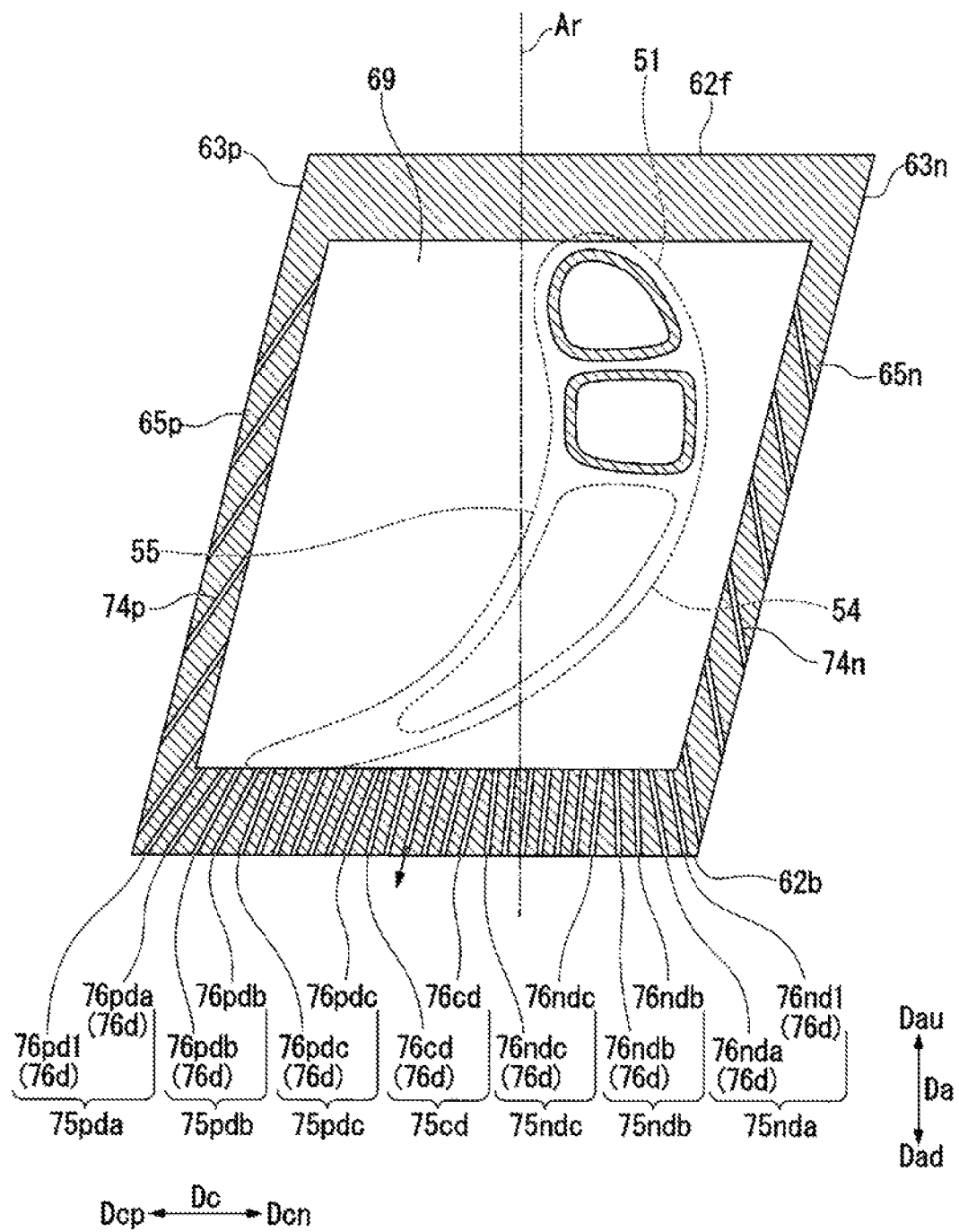
FIG. 8 is a cross-sectional view of a stator vane according to a fifth embodiment of the present invention.

A stator vane according to a fifth embodiment of the present invention will be described below with reference to FIG. 8.

In the stator vane in the present embodiment, the suction-side passage 73n of the stator vane in the first embodiment is changed to a plurality of suction-side end surface passages 74n, the pressure-side passage 73p of the stator vane in the first embodiment is changed to a plurality of pressure-side end surface passages 74p, and the arrangement or the like of the plurality of rear-end passages 76 of the stator vane in the first embodiment is changed. The rest of the configuration of the stator vane in the present embodiment is the same as the configuration in the first embodiment.

Any of the plurality of suction-side end surface passages 74n communicates with an inner cavity 69 and opens at a suction-side end surface 63n. The plurality of suction-side end surface passages 74n in the present embodiment are parallel to each other. However, the plurality of suction-side end surface passages 74n may not be parallel to each other. Any of the plurality of pressure-side end surface passages 74p communicates with the inner cavity 69 and opens at a pressure-side end surface 63p. The plurality of pressure-side end surface passages 74p in the present embodiment are parallel to each other. However, the plurality of pressure-side end surface passages 74p may not be parallel to each other.

The stator vane in the present embodiment include a first suction-side rear-end passage group 75nda, a second suction-side rear-end passage group 75ndb, a third suction-side rear-end passage group 75ndc, a central rear-end passage group 75cd, a first pressure-side rear-end passage group 75pda, a second pressure-side rear-end passage group 75pdb, and a third pressure-side rear-end passage group 75pdc, as rear-end passage groups. All of a plurality of rear-end passages 76d belong to any of the plurality of rear-end passage groups.

The first suction-side rear-end passage group 75nda includes a suction-side first rear-end passage 76nd1, and a plurality of rear-end passages 76nda that are aligned to extend from this suction-side first rear-end passage 76nd1 toward the circumferential pressure-side (lateral direction) Dcp. The plurality of rear-end passages 76nda that constitute this first suction-side rear-end passage group 75nda are parallel to each other, and any of the plurality of rear-end passages 76nda gradually extends closer to the suction-side end surface 63n toward the axial downstream side Dad.

The second suction-side rear-end passage group 75ndb is adjacent to the first suction-side rear-end passage group 75nda in the circumferential direction (lateral direction) Dc. The second suction-side rear-end passage group 75ndb includes a plurality of rear-end passages 76ndb aligned in the circumferential direction (lateral direction) Dc. The plurality of rear-end passages 76ndb that constitute this second suction-side rear-end passage group 75ndb are parallel to each other, and any of the plurality of rear-end passages 76ndb gradually extends closer to the suction-side end surface 63n toward the axial downstream side Dad. An amount of displacement of each of the plurality of rear-end passages 76ndb that constitute the second suction-side rear-end passage group 75ndb toward the suction-side end surface 63n with respect to a unit displacement amount toward the axial downstream side Dad is smaller than the amount of displacement of each of the plurality of rear-end passages 76nda that constitute the first suction-side rear-end passage group 75nda. In other words, an angle of each of the plurality of rear-end passages 76ndb that constitute the second suction-side rear-end passage group 75ndb with respect to the suction-side end surface 63n is smaller than an angle of each of the plurality of rear-end passages 76nda that constitute the first suction-side rear-end passage group 75nda with respect to the suction-side end surface 63n.

The third suction-side rear-end passage group 75ndc is adjacent to the second suction-side rear-end passage group 75ndb in the circumferential direction (lateral direction) Dc. The third suction-side rear-end passage group 75ndc includes a plurality of rear-end passages 76ndc aligned in the circumferential direction (lateral direction) Dc. The plurality of rear-end passages 76ndc that constitute this third suction-side rear-end passage group 75ndc are parallel to each other, and any of the plurality of rear-end passages 76ndc gradually extends closer to the suction-side end surface 63n toward the axial downstream side Dad. An amount of displacement of each of the plurality of rear-end passages 76ndc that constitute the third suction-side rear-end passage group 75ndc toward the suction-side end surface 63n with respect to the unit displacement amount toward the axial downstream side Dad is smaller than the amount of displacement of each of the plurality of rear-end passages 76ndb that constitute the second suction-side rear-end passage group 75ndb. In other words, an angle of each of the plurality of rear-end passages 76ndc that constitute the third suction-side rear-end passage group 75ndc with respect to the suction-side end surface 63n is smaller than an angle of each of the plurality of rear-end passages 76*ndb* that constitute the second suction-side rear-end passage group 75*ndb* with respect to the suction-side end surface 63*n*.

The first pressure-side rear-end passage group 75*pda* includes a pressure-side first rear-end passage 76*pd*1, and a plurality of rear-end passages 76*pda* that are aligned to extend from this pressure-side first rear-end passage 76*pd*1 toward the circumferential pressure-side (lateral direction) Dcp. The plurality of rear-end passages 76*pda* that constitute this first pressure-side rear-end passage group 75*pda* are parallel to each other, and any of the plurality of rear-end passages 76*pda* gradually extends closer to the pressure-side end surface 63*p* toward the axial downstream side Dad.

The second pressure-side rear-end passage group 75*pdb* is adjacent to the first pressure-side rear-end passage group 75*pda* in the circumferential direction (lateral direction) Dc. The second pressure-side rear-end passage group 75*pdb* includes a plurality of rear-end passages 76*pdb* aligned in the circumferential direction (lateral direction) Dc. The plurality of rear-end passages 76*pdb* that constitute this second pressure-side rear-end passage group 75*pdb* are parallel to each other, and any of the plurality of rear-end passages 76*pdb* gradually extends closer to the pressure-side end surface 63*p* toward the axial downstream side Dad. An amount of displacement of each of the plurality of rear-end passages 76*pdb* that constitute the second pressure-side rear-end passage group 75*pdb* toward the pressure-side end surface 63*p* with respect to the unit displacement amount toward the axial downstream side Dad is smaller than the amount of displacement of each of the plurality of rear-end passages 76*pda* that constitute the first pressure-side rear-end passage group 75*pda*. In other words, an angle of each of the plurality of rear-end passages 76*pdb* that constitute the second pressure-side rear-end passage group 75*pdb* with respect to the pressure-side end surface 63*p* is smaller than an angle of each of the plurality of rear-end passages 76*pda* that constitute the first pressure-side rear-end passage group 75*pda* with respect to the pressure-side end surface 63*p*.

The third pressure-side rear-end passage group 75*pdc* is adjacent to the second pressure-side rear-end passage group 75*pdb* in the circumferential direction (lateral direction) Dc. The third pressure-side rear-end passage group 75*pdc* includes a plurality of rear-end passages 76*pdc* aligned in the circumferential direction (lateral direction) Dc. The plurality of rear-end passages 76*pdc* that constitute this third pressure-side rear-end passage group 75*pdc* are parallel to each other, and any of the plurality of rear-end passages 76*pdc* gradually extends closer to the pressure-side end surface 63*p* toward the axial downstream side Dad. An amount of displacement of each of the plurality of rear-end passages 76*pdc* that constitute the third pressure-side rear-end passage group 75*pdc* toward the pressure-side end surface 63*p* with respect to the unit displacement amount toward the axial downstream side Dad is smaller than the amount of displacement of each of the plurality of rear-end passages 76*pdb* that constitute the second pressure-side rear-end passage group 75*pdb*. In other words, an angle of each of the plurality of rear-end passages 76*pdc* that constitute the third pressure-side rear-end passage group 75*pdc* with respect to the pressure-side end surface 63*p* is smaller than an angle of each of the plurality of rear-end passages 76*pdb* that constitute the second pressure-side rear-end passage group 75*pdb* with respect to the pressure-side end surface 63*p*.

As described above, similarly in the present embodiment, as with the above-described embodiments, the pressure-side first rear-end passage 76*pd*1 gradually extends closer to the pressure-side end surface 63*p* toward the axial downstream side Dad. In addition, the suction-side first rear-end passage 76*nd*1 gradually extends closer to the suction-side end surface 63*n* toward the axial downstream side Dad. Therefore, similarly in the present embodiment, as with the above-described embodiments, since the cooling capacity in a region that is easily heated, that is, a region located along a rear end surface 62*b* on the circumferential suction side Dcn and a region on the circumferential pressure-side Dcp in the gas path surface 64 is enhanced, and the cooling capacity in a region that is relatively less likely to be heated is lowered, the stator vane can be cooled effectively. Thus, similarly in the present embodiment, it is possible to suppress an increase in an amount of air used for cooling the stator vane while improving the durability of this stator vane.

Note that similarly in the present embodiment, as with the second to fourth embodiments, a central region between the region located along the rear end surface 62*b* on the circumferential suction side Dcn and the region on the circumferential pressure-side Dcp in the gas path surface 64 is mainly cooled with cooling air Ac flowing through a plurality of rear-end passages 76*cd* that constitute the central rear-end passage group 75*cd*.

In addition, in the present embodiment, all of the rear-end passages 76*d* belong to any of the plurality of rear-end passage groups, and the plurality of rear-end passages that constitute each of the rear-end passage groups are parallel to each other. Therefore, in the present embodiment, it is possible to suppress time and effort to machine the plurality of rear-end passages 76*d* as compared to the case where the plurality of rear-end passages extend in different directions.

Note that in the present embodiment, the suction-side passage 73*n* of the stator vane in the first embodiment is changed to the plurality of suction-side end surface passages 74*n*, and the pressure-side passage 73*p* of the stator vane in the first embodiment is changed to the plurality of pressure-side end surface passages 74*p*. However, as with the above-described embodiments including the first embodiment, the suction-side passage 73*n* may be employed in place of the plurality of suction-side end surface passages 74*n*, and the pressure-side passage 73*p* may be employed in place of the plurality of pressure-side end surface passages 74*p*.

In addition, the suction-side passage 73*n* of the stator vane in each of the first embodiment, the second embodiment, and the third embodiment may be changed to the plurality of suction-side end surface passages 74*n*, and the pressure-side passage 73*p* of the stator vanes in each of these embodiments may be changed to the plurality of pressure-side end surface passages 74*p*.

As described in each of the above embodiments, the stator vane may include one vane body provided in one shroud, or may include a plurality of vane bodies provided in one shroud. Then, an embodiment of a stator vane including a plurality of vane bodies provided in one shroud will be described below. Note that one shroud described here includes a shroud integrally molded in a casting process of a shroud, and a shroud integrally formed by connecting a plurality of split shrouds with a connection tool such as a bolt.

Sixth Embodiment of Stator Vane

A stator vane according to a sixth embodiment of the present invention will be described below with reference to FIG. 9.

The present embodiment is an example where the aspect of the first embodiment is applied to a stator vane including two vane bodies provided in one shroud.

Figure 9:
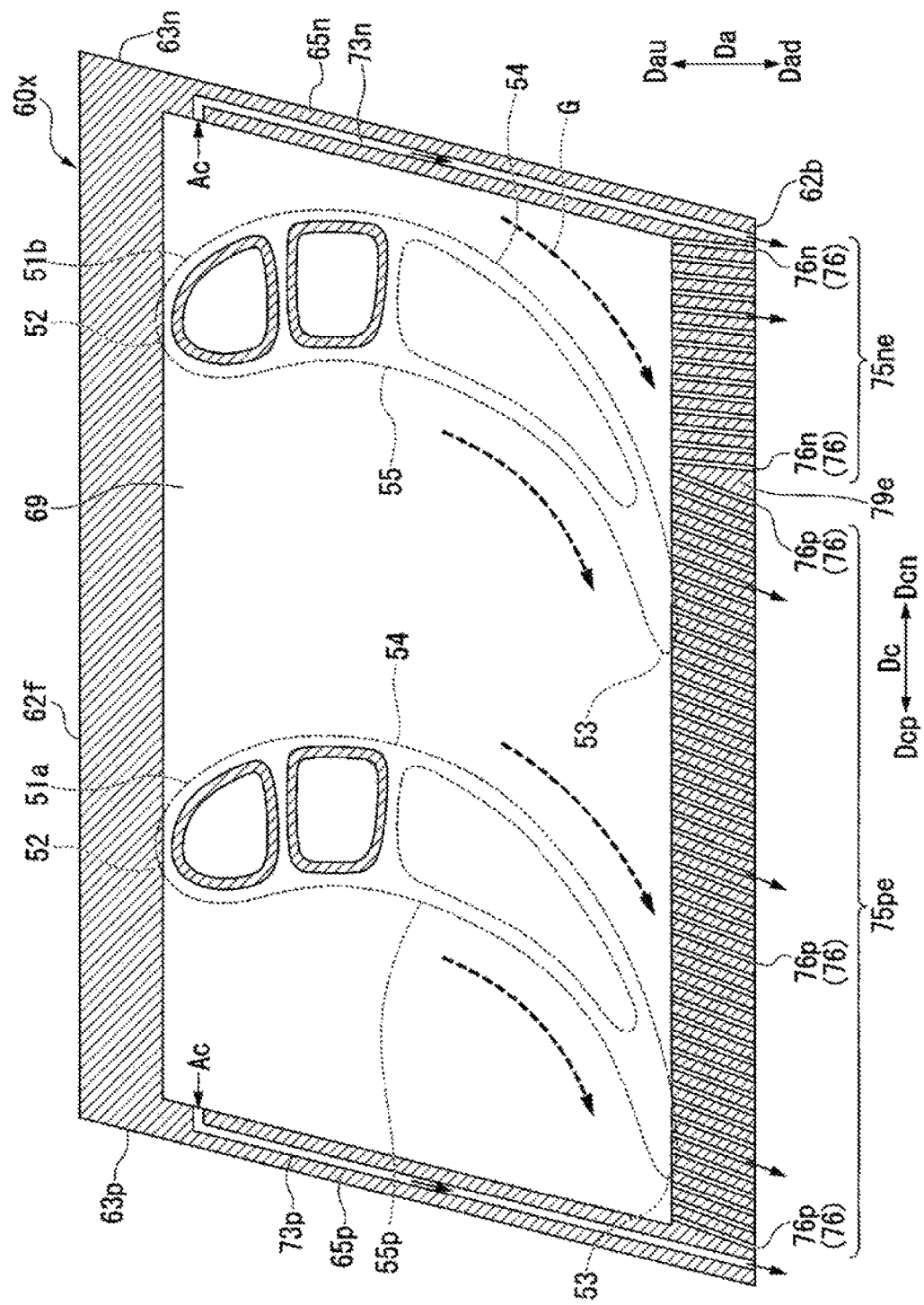
FIG. 9 is a cross-sectional view of a stator vane according to a sixth embodiment of the present invention.

As illustrated in FIG. 9, two vane bodies 51a, 51b are aligned in the circumferential direction Dc. A suction-side surface 54 of the first vane body 51a of the two vane bodies 51a, 51b is opposed to a pressure-side surface 55 of the second vane body 51b in the circumferential direction Dc.

As with the second embodiment, a shroud 60x in the present embodiment is also provided with an inner cavity 69, a suction-side passage 73n, a pressure-side passage 73p, and a plurality of rear-end passage groups including a plurality of rear-end passages 76. In the present embodiment, as with the first embodiment, the shroud 60x includes a suction-side rear-end passage group 75ne and a pressure-side rear-end passage group 75pe, as the rear-end passage group. All of the plurality of rear-end passages 76 belong to any of the suction-side rear-end passage group 75ne and the pressure-side rear-end passage group 75pe.

The plurality of rear-end passages 76n that constitute the suction-side rear-end passage group 75ne are parallel to each other, and any of the plurality of rear-end passages 76n gradually extends closer to the suction-side passage 73n toward the axial downstream side Dad.

The plurality of rear-end passages 76p that constitute the pressure-side rear-end passage group 75pe are parallel to each other, and any of the plurality of rear-end passages 76p gradually extends closer to the pressure-side passage 73p toward the axial downstream side Dad.

Similarly in the present embodiment, as with the first embodiment, a gap 79e between a position where a rear-end passage 76n closest to the pressure-side passage 73p among the plurality of rear-end passages 76n that constitute the suction-side rear-end passage group 75ne opens and a position where a rear-end passage 76p closest to the suction-side passage 73n among the plurality of rear-end passages 76p that constitute the pressure-side rear-end passage group 75pe opens is larger than the gap in the case where both the rear-end passages 76n, 76p are parallel to each other. The gap 79e between the suction-side rear-end passage group 75ne and the pressure-side rear-end passage group 75pe in the circumferential direction Dc is located approximately at the center in the circumferential direction Dc between a position in the circumferential direction Dc of a rear edge 53 of the second vane body 51b and the suction-side passage 73n. In other words, the gap 79e is located at a position having a distance of a maximum vane thickness of the second vane body 51b or more away from the position in the circumferential direction Dc of the rear edge 53 of the second vane body 51b toward the circumferential suction side Dcn, and a distance of the maximum vane thickness of the second vane body 51b or more away from the suction-side passage 73n toward the circumferential pressure-side Dcp.

As described above, similarly in the present embodiment, as with the first embodiment, since any of the plurality of rear-end passages 76n that constitute the suction-side rear-end passage group 75ne gradually extends closer to the suction-side passage 73n toward the axial downstream side Dad, the cooling capacity in a region located along a rear end surface 62b on the circumferential suction side Dcn in a gas path surface 64 can be enhanced. Further, similarly in the present embodiment, as with the first embodiment, since any of the plurality of rear-end passages 76p that constitute the pressure-side rear-end passage group 75pe gradually extends closer to the pressure-side passage 73p toward the axial downstream side Dad, the cooling capacity in a region located along the rear end surface 62b on the circumferential pressure-side Dcp in the gas path surface 64 can be enhanced.

As described above, a wake of combustion gas G is formed in a region on a downstream side of the rear edge 53 of the vane body 51 along a camber line. Therefore, the region on the downstream side of the rear edge 53 of the second vane body 51 along the camber line in the gas path surface 64 is easily heated with the combustion gas G Then, in the present embodiment, the gap 79e between the suction-side rear-end passage group 75ne and the pressure-side rear-end passage group 75pe in the circumferential direction Dc is positioned approximately at the center in the circumferential direction Dc between the rear edge 53 of the second vane body 51b and the suction-side passage 73n. That is, in the present embodiment, the position in the circumferential direction Dc of this gap 79e is positioned to avoid a region that is easily heated in the gas path surface 64. Thus, in the present embodiment, even when the cooling capacity at the gap 79e along the rear end surface 62b in the gas path surface 64 lowers, the durability of this gap 79e does not lower.

Seventh Embodiment of Stator Vane

Figure 10:
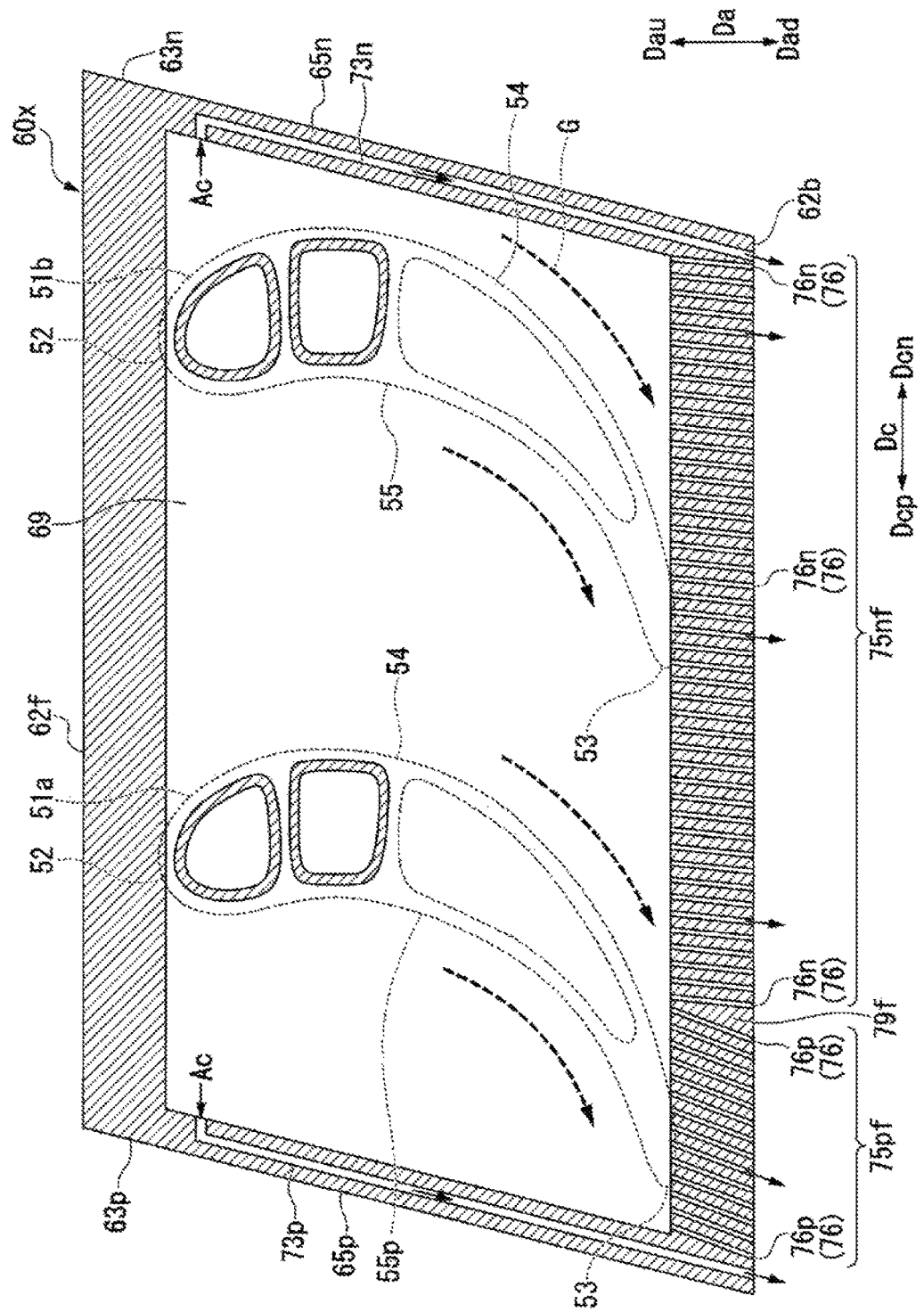
FIG. 10 is a cross-sectional view of a stator vane according to a seventh embodiment of the present invention.

A stator vane according to a seventh embodiment of the present invention will be described below with reference to FIG. 10.

The present embodiment is a modification of the sixth embodiment. As with the sixth embodiment, a shroud 60x in the present embodiment also includes a suction-side rear-end passage group 75nf and a pressure-side rear-end passage group 75pf, as rear-end passage groups. However, the number of rear-end passages 76n that constitute the suction-side rear-end passage group 75nf is larger than the number of the rear-end passages 76n that constitute the suction-side rear-end passage group 75ne in the sixth embodiment. In addition, the number of rear-end passages 76p that constitute the pressure-side rear-end passage group 75pf is smaller than the number of the rear-end passages 76p that constitute the pressure-side rear-end passage group 75pe in the sixth embodiment. Therefore, in the present embodiment, a position of a gap 79f between the suction-side rear-end passage group 75nf and the pressure-side rear-end passage group 75pf is positioned closer to the circumferential pressure-side Dcp than the position of the gap 79e between the suction-side rear-end passage group 75ne and the pressure-side rear-end passage group 75pe in the sixth embodiment.

In the present embodiment, the position of the gap 79f between the suction-side rear-end passage group 75nf and the pressure-side rear-end passage group 75pf in the circumferential direction Dc is positioned by a distance of a substantially maximum vane thickness of a first vane body 51a from a position in the circumferential direction Dc of a rear edge 53 of the first vane body 51a toward the circumferential suction side Dcn. Thus, similarly in the present embodiment, as with the sixth embodiment, the position in the circumferential direction Dc of the gap 79f is positioned to avoid a region that is easily heated in a gas path surface 64.

Similarly in the present embodiment, as with the sixth embodiment, the cooling capacity in a region located along a rear end surface 62b on the circumferential suction side Dcn and a region located along the rear end surface 62b on the circumferential pressure-side Dcp in the gas path surface 64 can be enhanced. In addition, since the gap 79f described above is positioned to avoid a region that is easily heated, even when the cooling capacity at the gap 79f along the rear end surface 62b lowers, the durability of this gap 79f does not lower.

Eighth Embodiment of Stator Vane

A stator vane according to an eighth embodiment of the present invention will be described below with reference to FIG. 11.

The present embodiment is an example where the aspect of the first embodiment is applied to a stator vane including two vane bodies provided in one shroud.

Figure 11:
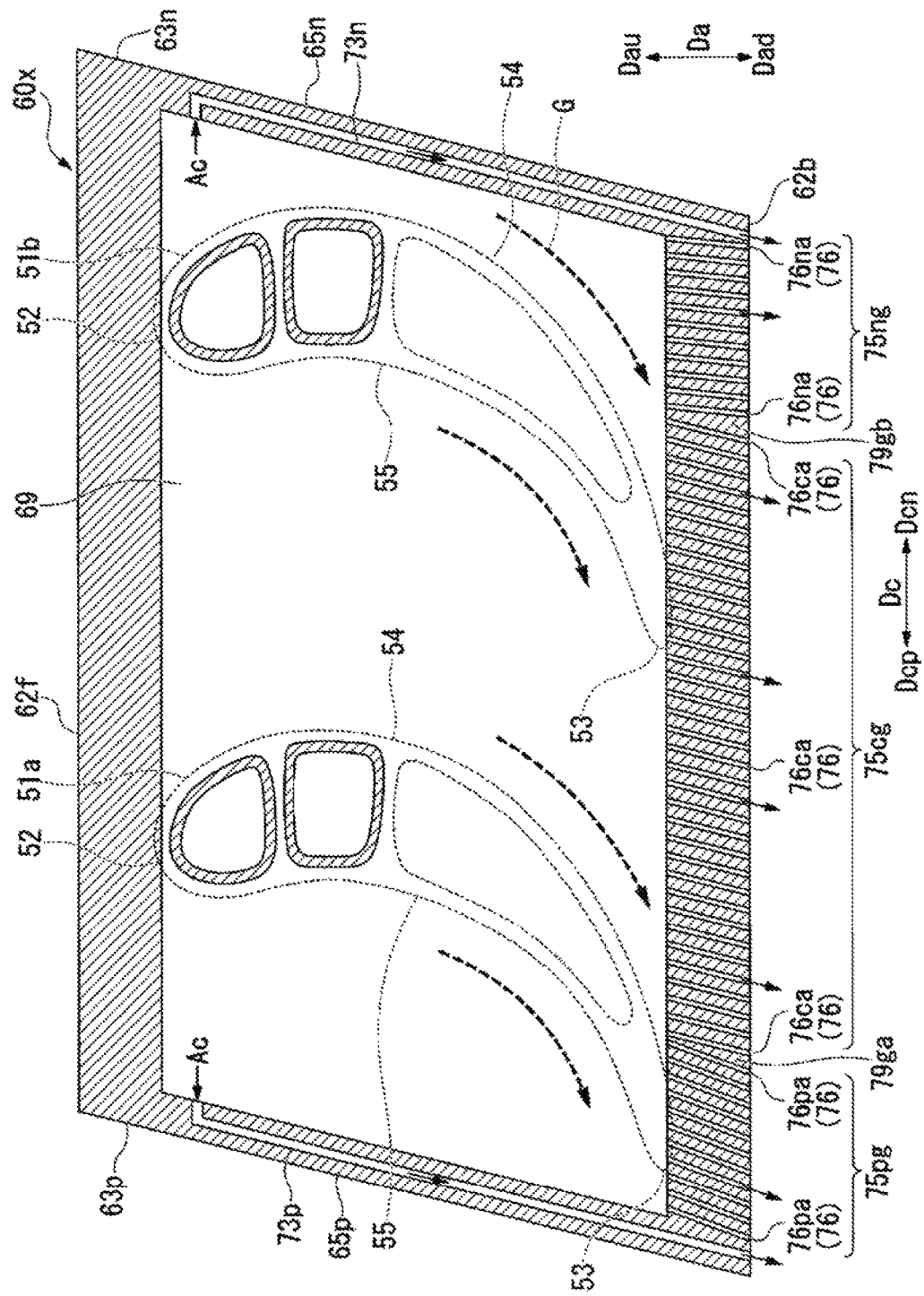
FIG. 11 is a cross-sectional view of a stator vane according to an eighth embodiment of the present invention.

As illustrated in FIG. 11, two vane bodies 51a, 51b are aligned in the circumferential direction Dc. A suction-side surface 54 of the first vane body 51a of the two vane bodies 51a, 51b is opposed to a pressure-side surface 55 of the second vane body 51b in the circumferential direction Dc.

As with the second embodiment, a shroud 60x in the present embodiment is also provided with an inner cavity 69, a suction-side passage 73n, a pressure-side passage 73p, and a plurality of rear-end passage groups including a plurality of rear-end passages 76. Similarly in the present embodiment, as with the second embodiment, the shroud 60x includes a suction-side rear-end passage group 75ng, a central rear-end passage group 75cg, and a pressure-side rear-end passage group 75pg, as rear-end passage groups. All of the plurality of rear-end passages 76 belong to any of the suction-side rear-end passage group 75ng, the central rear-end passage group 75cg, and the pressure-side rear-end passage group 75pg.

A plurality of rear-end passages 76na that constitute the suction-side rear-end passage group 75ng are parallel to each other, and any of the plurality of rear-end passages 76na gradually extends closer to the suction-side passage 73n toward the axial downstream side Dad.

A plurality of rear-end passages 76pa that constitute the pressure-side rear-end passage group 75pg are parallel to each other, and any of the plurality of rear-end passages 76pa gradually extends closer to the pressure-side passage 73p toward the axial downstream side Dad.

An angle of each of a plurality of rear-end passages 76ca that constitutes the central rear-end passage group 75cg with respect to the pressure-side passage 73p or the suction-side passage 73n is an angle between an angle of each of the plurality of rear-end passages 76na that constitute the suction-side rear-end passage group 75ng with respect to the pressure-side passage 73p or the suction-side passage 73n, and an angle of each of the plurality of rear-end passages 76pa that constitute the pressure-side rear-end passage group 75pg with respect to the pressure-side passage 73p or the suction-side passage 73n.

In the present embodiment, as with the second embodiment, a gap 79gb between a position where a rear-end passage 76na closest to the pressure-side passage 73p among the plurality of rear-end passages 76na that constitute the suction-side rear-end passage group 75ng opens and a position where a rear-end passage 76ca closest to the suction-side passage 73n among the plurality of rear-end passages 76ca that constitute the central rear-end passage group 75cg opens is larger than the gap in the case where both the rear-end passages 76na, 76ca are parallel to each other. In addition, a gap 79ga between a position where a rear-end passage 76pa closest to the suction-side passage 73n among the plurality of rear-end passages 76pa that constitute the pressure-side rear-end passage group 75pg opens and a position where a rear-end passage 76ca closest to the pressure-side passage 73p among the plurality of rear-end passages 76ca that constitute the central rear-end passage group 75cg opens is larger than the gap in the case where both the rear-end passages 76pa, 76ca are parallel to each other.

The gap 79gb between the suction-side rear-end passage group 75ng and the central rear-end passage group 75cg in the circumferential direction Dc is positioned approximately at the center in the circumferential direction Dc between a position in the circumferential direction Dc of a rear edge 53 of the second vane body 51b and the suction-side passage 73n. In other words, the gap 79gb is positioned by a distance of a maximum vane thickness of the second vane body 51b or more away from the position in the circumferential direction Dc of the rear edge 53 of the second vane body 51b toward the circumferential suction side Dcn, and a distance of the maximum vane thickness of the second vane body 51b or more away from the suction-side passage 73n toward the circumferential pressure-side Dcp. That is, in the present embodiment, the position in the circumferential direction Dc of this gap 79gb is positioned to avoid a region that is easily heated in a gas path surface 64. In addition, the gap 79ga between the pressure-side rear-end passage group 75pg and the central rear-end passage group 75cg in the circumferential direction Dc is positioned by a distance in the circumferential direction Dc of a substantially maximum vane thickness of the first vane body 51a from a position in the circumferential direction Dc of the rear edge 53 of the first vane body 51a toward the circumferential suction side Dcn. That is, in the present embodiment, the position in the circumferential direction Dc of this gap 79ga is positioned to avoid the region that is easily heated in the gas path surface 64.

Similarly in the present embodiment, as with the second embodiment, since the plurality of rear-end passages 76na that constitute the suction-side rear-end passage group 75ng gradually extend closer to the suction-side passage 73n toward the axial downstream side Dad, the cooling capacity in a region located along a rear end surface 62b on the circumferential suction-side Dcn in the gas path surface 64 can be enhanced. Further, similarly in the present embodiment, as with the second embodiment, since the plurality of rear-end passages 76pa that constitute the pressure-side rear-end passage group 75pg gradually extend closer to the pressure-side passage 73p toward the axial downstream side Dad, the cooling capacity in a region located along the rear end surface 62b on the circumferential pressure-side Dcp in the gas path surface 64 can be enhanced.

In addition, in the present embodiment, since the gaps 79ga, 79gb described above are positioned to avoid a region that is easily heated, even when the cooling capacity at the gaps 79ga, 79gb along the rear end surface 62b lowers, the durability of these gaps 79ga, 79gb does not lower.

As described above, the sixth embodiment and the seventh embodiment are the examples where the aspect of the first embodiment is applied to the stator vane including the two vane bodies in the one shroud. In addition, the eighth embodiment is the example where the aspect of the second embodiment is applied to the stator vane including the two vane bodies in the one shroud. However, the aspect of any of the third to fifth embodiments may be applied to the stator vane including the two vane bodies in the one shroud.

INDUSTRIAL APPLICABILITY

According to an aspect of the present invention, it is possible to effectively cool a gas turbine stator vane and suppress an amount of air used for cooling while improving durability.

REFERENCE SIGNS LIST

10 Gas turbine
11 Gas turbine rotor
15 Gas turbine casing
20 Compressor
21 Compressor rotor
25 Compressor casing
30 Combustor
40 Turbine
41 Turbine rotor
42 Rotor shaft
43 Rotor vane row
43a Rotor vane
45 Turbine casing
45a Outer casing
45b Inner casing
45c Ring segment
45p Cooling air passage
46 Stator vane row
46a Stator vane
49 Combustion gas flow path
50 Stator vane
51 Vane body
51a First vane body
51b Second vane body
52 Front edge
53 Rear edge
54 Suction-side surface
55 Pressure-side surface
60o Outer shroud
60i Inner shroud
60x Shroud
61 Outer shroud body
62f Front end surface
62b Rear end surface
63n Suction-side end surface
63p Pressure-side end surface
64 Gas path surface
65 Peripheral wall
66 Recessed portion
67 Impingement plate
69 Inner cavity
71 Vane air passage
72 Vane surface ejection passage
73n Suction-side passage
73p Pressure-side passage
74n Suction-side end surface passage
74p Pressure-side end surface passage
75n, 75na, 75nb, 75ne, 75nf, 75ng Suction-side rear-end passage group
75nda First suction-side rear-end passage group
75ndb Second suction-side rear-end passage group
75ndc Third suction-side rear-end passage group
75p, 75pa, 75pb, 75pe, 75pf, 75pg Pressure-side rear-end passage group
75pda First pressure-side rear-end passage group
75pdb Second pressure-side rear-end passage group
75pdc Third pressure-side rear-end passage group
75ca, 75cb, 75cc, 75cd, 75cg Central rear-end passage group
76, 76a, 76b, 76c, 76d, 76n, 76na, 76nb, 76p, 76pa, 76pb Rear-end passage
76n1, 76na1, 76nb1, 76nc1, 76nd1 Suction-side first rear-end passage
76p1, 76pa1, 76pb1, 76pc1, 76pd1 Pressure-side first rear-end passage
76nc2 Suction-side second rear-end passage
76pc2 Pressure-side second rear-end passage
79e, 79f, 79ga, 79gb Gap
A Air
Ac Cooling air
F Fuel
G Combustion gas
Gw Wake
Da Axial direction
Dau Axial upstream side
Dad Axial downstream side
Dc Circumferential direction (lateral direction)
Dcp Circumferential pressure side
Dcn Circumferential suction side
Dr Radial direction (vane height direction)
Dri Radial inner side
Dro Radial outer side

The invention claimed is:

1. A gas turbine stator vane comprising:
a vane body having a blade shape and disposed in a combustion gas flow path;
a shroud provided at an end in a vane height direction of the vane body; wherein
the shroud includes:
a gas path surface being in contact with combustion gas flowing through the combustion gas flow path;
a front end surface being an end surface on a front edge side with respect to a rear edge of the vane body, the front end surface facing an upstream side from which the combustion gas flows in the combustion gas flow path;
a rear end surface located back-to-back with the front end surface, the rear end surface facing a downstream side to which the combustion gas flows in the combustion gas flow path;
a suction-side end surface connecting the front end surface to the rear end surface, the suction-side end surface being an end surface on a suction-side surface side with respect to a pressure-side surface of the vane body;
a pressure-side end surface located back-to-back with the suction-side end surface, the pressure-side end surface connecting the front end surface to the rear end surface, and being an end surface on a pressure-side surface side with respect to the suction-side surface of the vane body;
a cavity formed in a region surrounded by the front end surface, the rear end surface, the suction-side end surface, and the pressure-side end surface, the cavity receiving cooling air;
a suction-side passage disposed on the suction-side end surface side with respect to the cavity in a lateral direction in which the suction-side end surface and the pressure-side end surface are aligned, the suction-side passage communicating with the cavity, extending along the suction-side end surface toward the downstream side, and opening at the rear end surface;
a pressure-side passage disposed on the pressure-side end surface side with respect to the cavity in the lateral direction, the pressure-side passage communicating with the cavity, extending along the pressure-side end surface toward the downstream side, and opening at the rear end surface; and
a plurality of rear-end passages disposed to be aligned in the lateral direction between the suction-side passage and the pressure-side passage on the rear end surface side with respect to the cavity, the plurality of rear-end passages communicating with the cavity, and opening at the rear end surface, a suction-side first rear-end passage closest to the suction-side passage in the lateral direction among the plurality of rear-end passages gradually extends closer to the suction-side passage toward the downstream side, a pressure-side first rear-end passage closest to the pressure-side passage in the lateral direction among the plurality of the rear-end passages gradually extends closer to the pressure-side passage toward the downstream side, a plurality of the rear-end passages including the suction-side first rear-end passage and being aligned from the suction-side first rear-end passage in the lateral direction constitute a suction-side rear-end passage group, a plurality of the rear-end passages including the pressure-side first rear-end passage and being aligned from the pressure-side first rear-end passage in the lateral direction constitute a pressure-side rear-end passage group, the plurality of rear-end passages constituting the suction-side rear-end passage group are parallel to each other, and the plurality of rear-end passages constituting the pressure-side rear-end passage group are parallel to each other.

2. The gas turbine stator vane according to claim 1, comprising:
a gap located between the rear-end passages adjacent to each other in the lateral direction between a rear-end passage closest to a pressure-side passage among the plurality of rear-end passages constituting the suction-side rear-end passage group and a rear-end passage closest to a suction-side passage among the plurality of rear-end passages constituting the pressure-side rear-end passage group, the gap gradually becoming larger toward the downstream side.

3. The gas turbine stator vane according to claim 1, wherein
among the plurality of rear-end passages, some of the plurality of rear-end passages except the plurality of rear-end passages constituting the suction-side rear-end passage group and the plurality of rear-end passages constituting the pressure-side rear-end passage group are parallel to the suction-side end surface.

4. A gas turbine stator vane comprising:
a vane body having a blade shape and disposed in a combustion gas flow path;
a shroud provided at an end in a vane height direction of the vane body; wherein
the shroud includes:
a gas path surface being in contact with combustion gas flowing through the combustion gas flow path;
a front end surface being an end surface on a front edge side with respect to a rear edge of the vane body, the front end surface facing an upstream side from which the combustion gas flows in the combustion gas flow path;
a rear end surface located back-to-back with the front end surface, the rear end surface facing a downstream side to which the combustion gas flows in the combustion gas flow path;
a suction-side end surface connecting the front end surface to the rear end surface, the suction-side end surface being an end surface on a suction-side surface side with respect to a pressure-side surface of the vane body;
a pressure-side end surface located back-to-back with the suction-side end surface, the pressure-side end surface connecting the front end surface to the rear end surface, and being an end surface on a pressure-side surface side with respect to the suction-side surface of the vane body;

a cavity formed in a region surrounded by the front end surface, the rear end surface, the suction-side end surface, and the pressure-side end surface, the cavity receiving cooling air; and a plurality of rear-end passage groups each including a plurality of rear-end passages disposed to be aligned in a lateral direction in which the suction-side end surface and the pressure-side end surface are aligned on the rear end surface side with respect to the cavity, the plurality of rear-end passages communicating with the cavity, and opening at the rear end surface, the plurality of rear-end passages constituting each of the plurality of rear-end passage groups are parallel to each other, a plurality of the rear-end passages constituting a suction-side rear-end passage group closest to the suction-side end surface in the lateral direction among the plurality of rear-end passage groups gradually extend closer to the suction-side end surface toward the downstream side, and a plurality of the rear-end passages constituting a pressure-side rear-end passage group closest to the pressure-side end surface in the lateral direction among the plurality of rear-end passage groups gradually extend closer to the pressure-side end surface toward the downstream side.

5. The gas turbine stator vane according to claim 1, comprising:
a central rear-end passage group including some of the plurality of rear-end passages and being located between the suction-side rear-end passage group and the pressure-side rear-end passage group in the lateral direction.

6. The gas turbine stator vane according to claim 5, comprising: at least one of gaps including
a gap located between the rear-end passages adjacent to each other in the lateral direction between the rear-end passage closest to the pressure-side end surface among the plurality of rear-end passages constituting the suction-side rear-end passage group and a rear-end passage closest to a suction-side end surface among the plurality of rear-end passages constituting the central rear-end passage group, the gap gradually becoming larger toward the downstream side, and a gap located between the rear-end passages adjacent to each other in the lateral direction between the rear-end passage closest to a suction-side end surface among the plurality of rear-end passages constituting the pressure-side rear-end passage group and a rear-end passage closest to a pressure-side end surface among the plurality of rear-end passages constituting the central rear-end passage group, the gap gradually becoming larger toward the downstream side.

7. The gas turbine stator vane according to claim 5, wherein
any of the plurality of rear-end passages constituting the central rear-end passage group are parallel to the suction-side end surface.

8. The gas turbine stator vane according to claim 1, comprising
a plurality of the vane bodies,
the plurality of vane bodies being provided in the one shroud.

9. A gas turbine comprising:
the gas turbine stator vane according to claim 1;
a rotor configured to rotate around an axis;
a casing covering an outer circumferential side of the rotor; and
a combustor configured to generate the combustion gas by combustion of fuel and send the combustion gas into the casing, wherein
the gas turbine stator vane is affixed to an inner circumferential side of the casing.

10. The gas turbine stator vane according to claim 2, wherein
among the plurality of rear-end passages, some of the plurality of rear-end passages except the plurality of rear-end passages constituting the suction-side rear-end passage group and the plurality of rear-end passages constituting the pressure-side rear-end passage group are parallel to the suction-side end surface.

11. The gas turbine stator vane according to claim 4, comprising:
a central rear-end passage group including some of the plurality of rear-end passages and being located between the suction-side rear-end passage group and the pressure-side rear-end passage group in the lateral direction.

12. The gas turbine stator vane according to claim 11, comprising: at least one of gaps including
a gap located between the rear-end passages adjacent to each other in the lateral direction between the rear-end passage closest to the pressure-side end surface among the plurality of rear-end passages constituting the suction-side rear-end passage group and a rear-end passage closest to a suction-side end surface among the plurality of rear-end passages constituting the central rear-end passage group, the gap gradually becoming larger toward the downstream side, and
a gap located between the rear-end passages adjacent to each other in the lateral direction between the rear-end passage closest to a suction-side end surface among the plurality of rear-end passages constituting the pressure-side rear-end passage group and a rear-end passage closest to a pressure-side end surface among the plurality of rear-end passages constituting the central rear-end passage group, the gap gradually becoming larger toward the downstream side.

13. The gas turbine stator vane according to claim 6, wherein
any of the plurality of rear-end passages constituting the central rear-end passage group are parallel to the suction-side end surface.

14. The gas turbine stator vane according to claim 11, wherein
any of the plurality of rear-end passages constituting the central rear-end passage group are parallel to the suction-side end surface.

15. The gas turbine stator vane according to claim 12, wherein
any of the plurality of rear-end passages constituting the central rear-end passage group are parallel to the suction-side end surface.

16. The gas turbine stator vane according to claim 4, comprising
a plurality of the vane bodies,
the plurality of vane bodies being provided in the one shroud.

17. A gas turbine comprising:
the gas turbine stator vane according to claim 4;
a rotor configured to rotate around an axis;
a casing covering an outer circumferential side of the rotor; and
a combustor configured to generate the combustion gas by combustion of fuel and send the combustion gas into the casing, wherein
the gas turbine stator vane is affixed to an inner circumferential side of the casing.

* * * * *